United States Patent
Koo et al.

(10) Patent No.: US 11,275,525 B2
(45) Date of Patent: Mar. 15, 2022

(54) APPARATUS AND METHOD FOR IMPROVING WRITE THROUGHPUT OF MEMORY SYSTEM

(71) Applicant: SK hynix Inc., Gyeonggi-do (KR)

(72) Inventors: Dong-Hwan Koo, Gyeonggi-do (KR); Joo-Il Lee, Gyeonggi-do (KR); Min-Kyu Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/859,613

(22) Filed: Apr. 27, 2020

(65) Prior Publication Data

US 2021/0157514 A1    May 27, 2021

(30) Foreign Application Priority Data

Nov. 27, 2019   (KR) .......................... 10-2019-0154216

(51) Int. Cl.
*G06F 3/06* (2006.01)

(52) U.S. Cl.
CPC .......... *G06F 3/0656* (2013.01); *G06F 3/0613* (2013.01); *G06F 3/0631* (2013.01); *G06F 3/0653* (2013.01); *G06F 3/0658* (2013.01); *G06F 3/0659* (2013.01); *G06F 3/0683* (2013.01)

(58) Field of Classification Search
CPC .... G06F 3/0659; G06F 3/0656; G06F 3/0658; G06F 3/0631; G06F 3/0653; G06F 3/0683; G06F 3/0613
See application file for complete search history.

(56) References Cited

U.S. PATENT DOCUMENTS

| | | | | |
|---|---|---|---|---|
| 5,526,507 A | * | 6/1996 | Hill | G06F 11/1008 711/114 |
| 5,862,403 A | * | 1/1999 | Kanai | G06F 3/0601 710/6 |
| 2009/0172263 A1 | * | 7/2009 | Olbrich | G06F 3/0659 711/103 |
| 2021/0026713 A1 | * | 1/2021 | Puttaswamy | G06F 3/0604 |

FOREIGN PATENT DOCUMENTS

KR    10-1425620    7/2014

* cited by examiner

*Primary Examiner* — Ernest Unelus
(74) *Attorney, Agent, or Firm* — IP & T Group LLP

(57) ABSTRACT

A memory system comprising: a plurality of memory devices; a buffer memory suitable for buffering write data inputted from a host; and a controller suitable for: classifying the write data buffered in the buffer memory into N data groups according to logical addresses corresponding to the write data, N being a natural number greater than or equal to 2, selecting at least one data group among the N data groups when a size difference between at least two of the N data groups is equal to or more than a set size, and flushing at least one piece of data of the selected data group to at least one of the plurality of memory devices.

17 Claims, 14 Drawing Sheets

FIG. 1H

|  | | Flush 0 | | | | Flush 1 | | | |
|---|---|---|---|---|---|---|---|---|---|
| 1340 | F0 | X | X | X | X | 6 | 7 | 8 | 9 | MEMORY BUFFER0 |
| | | X | X | X | X | 10 | 11 | 12 | 13 | |
| | | X | X | X | X | 14 | 15 | 16 | 17 | |
| 1341 | F1 | X | X | X | X | 10 | 11 | 12 | 13 | MEMORY BUFFER1 |
| | | X | X | X | X | 14 | 15 | 16 | 17 | |
| | | 6 | 7 | 8 | 9 | 18 | 19 | 20 | 21 | |
| 1342 | F2 | X | X | X | X | 12 | 13 | 14 | 15 | MEMORY BUFFER2 |
| | | X | X | 6 | 7 | 16 | 17 | 18 | 19 | |
| | | 8 | 9 | 10 | 11 | 20 | 21 | 22 | 23 | |
| 1343 | F3 | X | X | X | X | 8 | 9 | 10 | 11 | MEMORY BUFFER3 |
| | | X | X | X | X | 12 | 13 | 14 | 15 | |
| | | X | X | 6 | 7 | 16 | 17 | 18 | 19 | |

Legend: Occupied, Empty, Flushing, Unreleased

APPARATUS AND METHOD FOR IMPROVING WRITE THROUGHPUT OF MEMORY SYSTEM

CROSS-REFERENCE TO RELATED APPLICATION

This application claims priority under 35 U.S.C. § 119 to Korean Patent Application No. 10-2019-0154216, filed on Nov. 27, 2019, which is incorporated herein by reference in its entirety.

BACKGROUND

1. Field

Various embodiments relate to a memory system, and more particularly, to an apparatus and method for improving write throughput through an efficient buffering operation of write data on a plurality of memory devices included in a memory system.

2. Discussion of the Related Art

Recently, a computer environment paradigm has shifted to ubiquitous computing, which enables a computer system to be accessed anytime and everywhere. As a result, the use of portable electronic devices such as mobile phones, digital cameras, notebook computers and the like has increased. Such portable electronic devices typically use or include a memory system that uses or embeds at least one memory device, i.e., a data storage device. The data storage device can be used as a main storage device or an auxiliary storage device of a portable electronic device.

In a computing device, unlike a hard disk, a data storage device embodied as a nonvolatile semiconductor memory device is advantageous in that it has excellent stability and durability because it has no mechanical driving part (e.g., a mechanical arm), and has high data access speed and low power consumption. Examples of such a data storage device include a universal serial bus (USB) memory device, a memory card having various interfaces, and a solid state drive (SSD).

SUMMARY

Various embodiments are directed to a memory system capable of rapidly and stably processing data to a memory device by minimizing the complexity and degradation in throughput of the memory system and maximizing the usage efficiency of the memory device, and an operation method thereof.

Also, various embodiments are directed to an apparatus and method capable of improving write throughput of a memory system through an efficient buffering operation of write data on a plurality of memory devices included in the memory system.

Also, various embodiments are directed to an apparatus and method capable of managing buffering operations of write data such that the sizes of write data, which are independently buffered in response to a plurality of memory devices included in a memory system, respectively, maintain differences within a preset size range.

In an embodiment, a memory system may include: a plurality of memory devices; a buffer memory suitable for buffering write data inputted from a host; and a controller suitable for: classifying the write data buffered in the buffer memory into N data groups according to logical addresses corresponding to the write data, N being a natural number greater than or equal to 2, selecting at least one data group among the N data groups when a size difference between at least two of the N data groups is equal to or more than a set size, and flushing at least one piece of data of the selected data group to at least one of the plurality of memory devices.

The controller may select the data group having a size larger by the set size or more than a data group having the smallest size among the N data groups.

The plurality of memory devices may be grouped into N memory device groups, the controller may include: N sub controllers respectively corresponding to the N memory device groups, each of the N sub controllers being suitable for independently controlling operations of the corresponding memory device group; an allocator suitable for: identifying the logical addresses of the write data buffered in the buffer memory, grouping the write data into the N data groups according to the logical addresses, and allocating the N data groups to the respective N sub controllers; and a monitor suitable for monitoring the size differences between the respective N data groups.

The monitor may be further suitable for: checking the sizes of the N data groups, selecting the data group having a size larger by the set size or more than the data group having the smallest size, among the N data groups, according to the checking result, and transmitting an acknowledgement signal to the sub controller to which the selected data group is allocated, among the N sub controllers.

Each of the N sub controllers may be further suitable for flushing, when the acknowledgement signal is received, at least some pieces of data in the data group allocated thereto, among the N data groups, to the corresponding memory device group of the N memory device groups.

Each of the N sub controllers may be further suitable for: padding, when the acknowledgement signal is received and the size of the data group allocated to the sub controllers is smaller than a threshold size, dummy data to at least some data of the data in the data group allocated thereto, among the N data groups, and flushing the dummy-padded data of the threshold size to the corresponding memory device group among the N memory device groups.

The monitor may check the sizes of the N data groups through relative occupation percentages of the N data groups in the buffer memory.

The allocator may group the write data into the N data groups, each of which contains write data in a corresponding logical address range of N logical address ranges.

The allocator may transfer physical position information of data in the N data groups from the buffer memory to the N sub controllers, respectively.

The controller may be further suitable for selecting at least some pieces of data in the selected data group such that the size difference between the selected data group and the data group having the smallest size is less than the set size.

In an embodiment, an operation method of a memory system which includes a plurality of memory devices and a buffer memory for buffering write data inputted from a host, the operation method may include: classifying the write data buffered in the buffer memory into N data groups according to logical addresses corresponding to the write data, N being a natural number greater than or equal to 2; selecting at least one data group among the N data groups when a size difference between at least two of the N data groups is equal to or more than a set size, and flushing at least one piece of data of the selected data group to at least one of the plurality of memory devices.

The selecting may include selecting a data group having a size larger by the set size or more than a data group having the smallest size, among the N data groups.

The selecting of the data group may include: checking the sizes of the respective N data groups; and selecting the data group having a size larger by the set size or more than the data group having the smallest size according to the result of the checking of the sizes of the respective N data groups.

The sizes of the respective N data groups may be checked through relative occupation percentages of the N data groups in the buffer memory.

The flushing may include: padding, when a size of the selected data group is smaller than a threshold size, dummy data to at least some of the data in the data group allocated thereto, among the N data groups; and flushing the dummy-padded data of the threshold size to at least one of the memory devices.

The selecting may include selecting at least some pieces of data such that the size difference between the selected data group and the data group having the smallest size is less than the set size.

The classifying may include grouping the write data into the N data groups, each of which contains write data in a corresponding logical address range of N logical address ranges.

In an embodiment, a memory system may include: plural memory devices; plural buffers respectively corresponding to the plural memory devices; and control circuitry coupled to the memory devices through respective channels and suitable for controlling the memory devices to store therein data fully buffered in the corresponding buffers, respectively, the control circuitry may be further suitable for: monitoring amounts of data currently buffered in the respective buffers; and controlling a selected one of the memory devices to store at least a part of the data currently buffered in the corresponding buffer, and may the data currently buffered in the corresponding buffer may be greater by a set amount or greater than the least amount of data currently buffered in one of the buffers.

The effects of the apparatus and method in accordance with the present embodiments will be described as follows.

The memory system and the operation method thereof in accordance with the present embodiments may manage the buffering operations of write data such that the sizes of write data, which are independently buffered in response to the plurality of memory devices included in the memory system, respectively, maintain differences within the preset size range, and thus predictably operate the buffering spaces of the write data, corresponding to the respective memory devices.

Such an operation can prevent a situation in which a space shortage in some buffering spaces of the write data buffering spaces corresponding to the respective memory devices disturbs the use of the other buffering spaces.

BRIEF DESCRIPTION OF THE DRAWINGS

FIGS. 1A to 1J are diagrams for describing a buffering operation of write data on a plurality of memory devices included in a memory system.

DETAILED DESCRIPTION

Figure 1A:
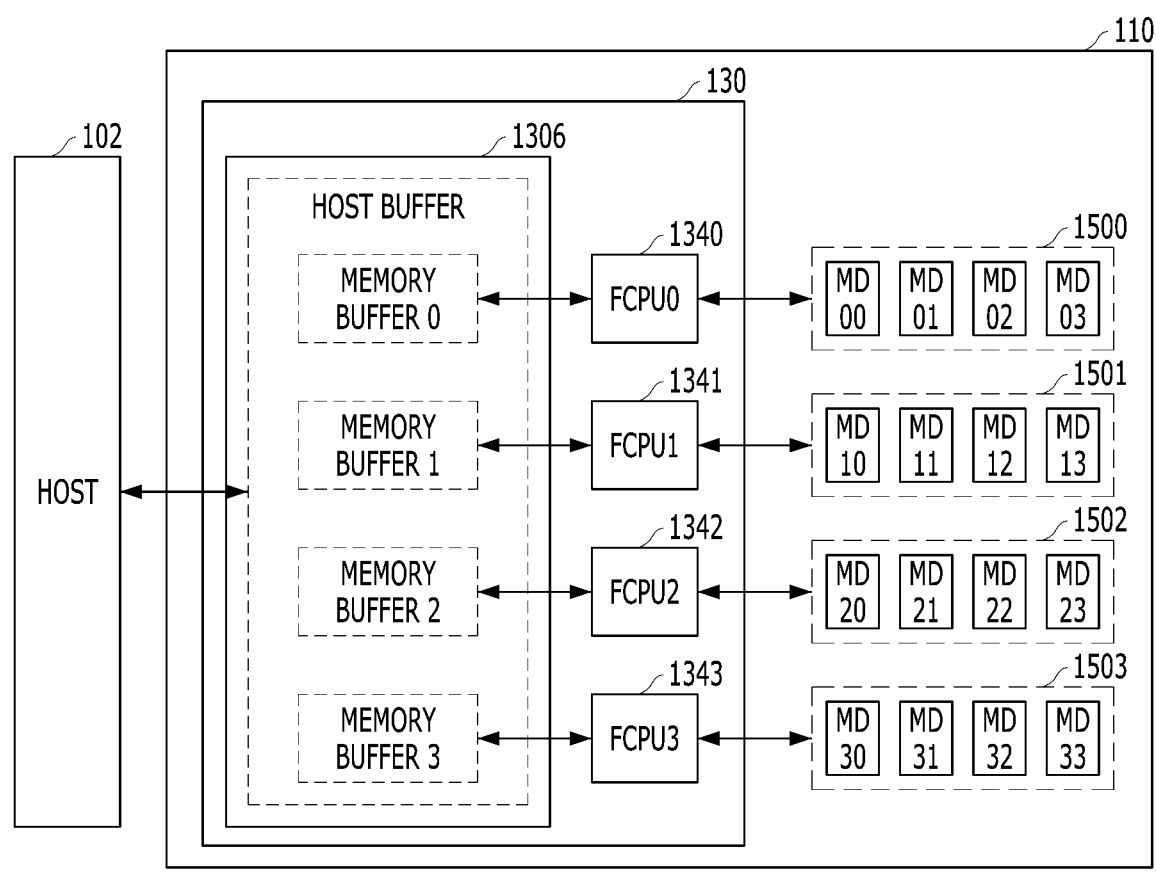

Various embodiments of the present invention are described below in more detail with reference to the accompanying drawings. We note, however, that the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

Throughout the specification, reference to "an embodiment," "another embodiment" or the like is not necessarily to only one embodiment, and different references to any such phrase are not necessarily to the same embodiment(s).

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present. Communication between two elements, whether directly or indirectly connected/coupled, may be wired or wireless, unless stated or the context indicates otherwise.

As used herein, singular forms may include the plural forms, unless the context clearly indicates otherwise. The articles 'a' and 'an' as used in this application and the appended claims should generally be construed to mean 'one or more' unless specified otherwise or clear from context to be directed to a singular form.

It will be further understood that the terms "comprises," "comprising," "includes," and "including" when used in this specification, specify the presence of the stated elements and do not preclude the presence or addition of one or more other elements.

Referring to FIG. 1A, a memory system 110 may be mounted in a computing device or mobile device, and exchange data with a host 102, to which the memory system 110 is operably coupled.

The memory system 110 may include a controller 130 and a plurality of memory devices MD<00, 01, 02, 03, 10, 11, 12, 13, 20, 21, 22, 23, 30, 31, 32, 33>. The controller 130 may control the plurality of memory devices MD<00, 01, 02, ..., 32, 33> to output data requested by the host 102, or control the plurality of memory devices MD<00, 01, 02, ..., 32, 33> to store data transferred from the host 102. Furthermore, the controller 130 may internally generate data for managing an operation of storing or outputting data of the host 102, and store or output the generated data in or to the plurality of memory devices MD<00, 01, 02, ..., 32, 33>. Each of the memory devices MD<00, 01, 02, ..., 32, 33> may include a plurality of blocks (not illustrated) each including a plurality of cells capable of storing data therein. The internal configurations of the plurality of memory devices MD<00, 01, 02, ..., 32, 33> may be changed according to the characteristics of the respective memory devices MD<00, 01, 02, ..., 32, 33>, the purpose of use of the memory system 110, or the specification of the memory system 110, requested by the host 102.

Specifically, the controller 130 may include a buffer memory 1306 and a plurality of sub controllers 1340 to 1343. The plurality of memory devices MD<00, 01, 02, . . . , 32, 33> may be divided into a plurality of memory device groups 1500 to 1503. For example, as illustrated in FIG. 1A, four memory devices MD<00, 01, 02, 03>, MD<10, 11, 12, 13>, MD<20, 21, 22, 23> or MD<30, 31, 32, 33> may form four memory device groups 1500, 1501, 1502 or 1503, respectively.

The plurality of sub controllers 1340 to 1343 may correspond to the plurality of memory device groups 1500 to 1503, respectively. The plurality of sub controllers 1340 to 1343 may independently control operations on the corresponding memory device groups 1500 to 1503, respectively, for example, read/write/erase operations.

For example, the first sub controller FCPU0 1340 corresponding to the first memory device group 1500 may control operations on each of the plurality of memory devices MD<00, 01, 02, 03> included in the first memory device group 1500. The second sub controller FCPU1 1341 corresponding to the second memory device group 1501 may control operations on each of the plurality of memory devices MD<10, 11, 12, 13> included in the second memory device group 1501. The third sub controller FCPU2 1342 corresponding to the third memory device group 1502 may control operations on each of the plurality of memory devices MD<20, 21, 22, 23> included in the third memory device group 1502. The fourth sub controller FCPU3 1343 corresponding to the fourth memory device group 1503 may control operations on each of the plurality of memory devices MD<30, 31, 32, 33> included in the fourth memory device group 1503.

The plurality of sub controllers 1340 to 1343 may be coupled to the plurality of memory device groups 1500 to 1503, respectively, through a plurality of data paths. In addition, as illustrated in FIG. 1J, the plurality of memory devices MD<00, 01, 02, 03> included in the first memory device group 1500 may be coupled to the first sub controller 1340 through different paths. The first memory device MD00 may be coupled to the first sub controller 1340 through a first channel CH1 and a first way W1, the second memory device MD01 may be coupled to the first sub controller 1340 through the first channel CH1 and a second way W2, the third memory device MD02 may be coupled to the first sub controller 1340 through a second channel CH2 and a first way W1, and the fourth memory device MD03 may be coupled to the first sub controller 1340 through the second channel CH2 and a second way W2. In this way, the second to fourth memory device groups 1501 to 1503 may be coupled to the second to fourth sub controllers, respectively, through a plurality of data paths. The number of channels and ways for coupling the plurality of sub controllers 1340 to 1343 to the respective memory device groups 1500 to 1503 may be changed according to the purpose of use of the memory system 110 or the specification of the memory system 110, required by the host 102.

The buffer memory 1306 may buffer commands and data which are inputted/outputted between the host 102 and the plurality of sub controllers 1340 to 1343. Specifically, while the plurality of sub controllers 1340 to 1343 control the plurality of memory device groups 1500 to 1503 in response to a request from the host 102, the buffer memory 1306 may temporarily store data read from the plurality of memory device groups 1500 to 1503, before the data are provided to the host 102. The plurality of sub controllers 1340 to 1343 may temporarily store data provided from the host 102 in the buffer memory 1306, before storing the data in the plurality of memory device groups 1500 to 1503. Furthermore, data which the plurality of sub controllers 1340 to 1343 generate in order to control read, write or erase operations of the plurality of memory device groups 1500 to 1503 may be stored in the buffer memory 1306.

In particular, the buffer memory 1306 may be used to buffer write data inputted from the host 102, before the write data are written to the plurality of memory device groups 1500 to 1503.

Specifically, a plural pieces of write data inputted from the host 102 may be buffered into a host buffer region HOST BUFFER of the buffer memory 1306 according to the order in which the pieces of write data are inputted. The plural pieces of write data buffered in the host buffer region HOST BUFFER may be divided and buffered into a plurality of memory buffer regions MEMORY BUFFER0 to MEMORY BUFFER3 corresponding to the respective sub controllers 1340 to 1343. The plural pieces of write data buffered in the host buffer region HOST BUFFER may be grouped into a plurality of data groups according to logical addresses corresponding to the write data. The plurality of data groups may be allocated to the respective memory buffer regions MEMORY BUFFER0 to MEMORY BUFFER3. For example, among the plural pieces of write data buffered in the host buffer region HOST BUFFER, write data whose logical address values range from 0 to 100 may be placed into a first data group, write data whose logical address values range from 101 to 200 may be placed into a second data group, write data whose logical address values range from 201 to 300 may be placed into a third data group, and write data whose logical address values range from 301 to 400 may be placed into a fourth data group. Furthermore, the write data in the first data group may be allocated to the first memory buffer region MEMORY BUFFER0, the write data in the second data group may be allocated to the second memory buffer region MEMORY BUFFER1, the write data in the third data group may be allocated to the third memory buffer region MEMORY BUFFER2, and the write data in the fourth data group may be allocated to the fourth memory buffer region MEMORY BUFFER3.

For reference, the reason why the plurality of memory buffer regions MEMORY BUFFER0 to MEMORY BUFFER3 are illustrated in FIG. 1A as being included in the host buffer region HOST BUFFER is because the write data buffered in the host buffer region HOST BUFFER are physically the same data as the write data which are allocated and buffered into the respective memory buffer regions MEMORY BUFFER0 to MEMORY BUFFER3. That is, the operation of allocating the write data buffered in the host buffer region HOST BUFFER to the respective memory buffer regions MEMORY BUFFER0 to MEMORY BUFFER3 logically seems like an operation of moving data. In reality, however, the write data which have been buffered into the buffer memory 1306 are managed in the host buffer region HOST BUFFER without an operation of physically moving data, and then allocated to and managed by the plurality of memory buffer regions MEMORY BUFFER0 to MEMORY BUFFER3.

The plurality of sub controllers 1340 to 1343 may program write data, buffered in the respective memory buffer regions MEMORY BUFFER0 to MEMORY BUFFER3, to the respective memory device groups 1500 to 1503. The plurality of memory devices MD<00, 01, 02, . . . , 32, 33> may be nonvolatile memory devices, and generally input/output data on a page basis. Therefore, according to a general method, the plurality of sub controllers 1340 to 1343 may program the write data, allocated to the respective memory buffer regions MEMORY BUFFER0 to MEMORY BUFFER3, to the respective memory device groups 1500 to 1503 in units, where each unit is of a set size, for example, a page. That is, when the sizes of the plurality of data groups buffered in the respective buffer regions MEMORY BUFFER0 to MEMORY BUFFER3 are each smaller than the set size, the plurality of sub controllers 1340 to 1343 may program the data groups to the respective memory device groups 1500 to 1503 in the set size, after other data are added to each group to satisfy the set size.

As described above, when the plurality of sub controllers 1340 to 1343 manage the plurality of memory buffer regions MEMORY BUFFER0 to MEMORY BUFFER3 according to the general method, the following problems may occur.

Figure 1B:
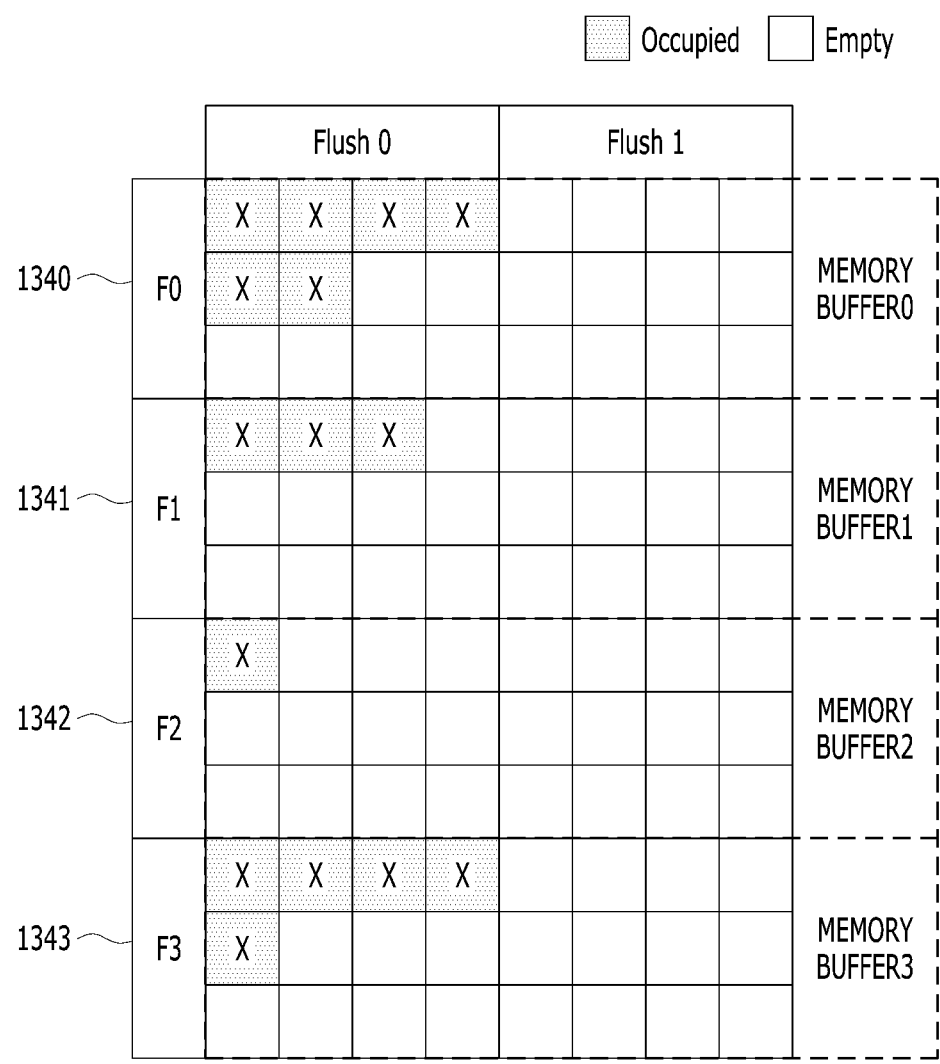

FIG. 1B illustrates the case in which write data smaller size than the threshold size are randomly inputted from the host 102 and buffered into the plurality of memory buffer regions MEMORY BUFFER0 to MEMORY BUFFER3, respectively. In particular, since a memory buffer region into which write data is buffered is decided according to the logical address of the write data, the sizes of the write data buffered into the respective memory buffer regions MEMORY BUFFER0 to MEMORY BUFFER3 may have large differences from one another. For example, as illustrated in FIG. 1B, a total of 16 pieces of write data may be buffered in the plurality of memory buffer regions MEMORY BUFFER0 to MEMORY BUFFER3 (Occupied). Among the 16 pieces of write data, seven pieces of write data may be buffered in the first memory buffer region MEMORY BUFFER0, three pieces of write data may be buffered in the second memory buffer region MEMORY BUFFER1, one piece of write data may be buffered in the third memory buffer region MEMORY BUFFER2, and five pieces of write data may be buffered in the fourth memory buffer region MEMORY BUFFER3. Therefore, the first memory buffer region MEMORY BUFFER0 may have an empty space into which 17 pieces of write data can be additionally buffered, the second memory buffer region MEMORY BUFFER1 may have an empty space into which 21 pieces of write data can be additionally buffered, the third memory buffer region MEMORY BUFFER2 may have an empty space into which 23 pieces of write data can be additionally buffered, and the fourth memory buffer region MEMORY BUFFER3 may have an empty space into which 19 pieces of write data can be additionally buffered.

In this way, the sizes of the write data buffered in the respective memory buffer regions MEMORY BUFFER0 to MEMORY BUFFER3 may have large differences from one another. According to a general method, the plurality of sub controllers 1340 to 1343 may program no data to the plurality of memory device groups 1500 to 1503, until the write data buffered in the respective memory buffer regions MEMORY BUFFER0 to MEMORY BUFFER3 have the threshold size. For example, when the number of pieces of write data buffered in each of the memory buffer regions MEMORY BUFFER0 to MEMORY BUFFER3 becomes equal to the threshold size of 12 as illustrated in FIG. 1B, the corresponding sub controller may flush the memory buffer region to program the write data to the corresponding memory device group.

Figure 1C:
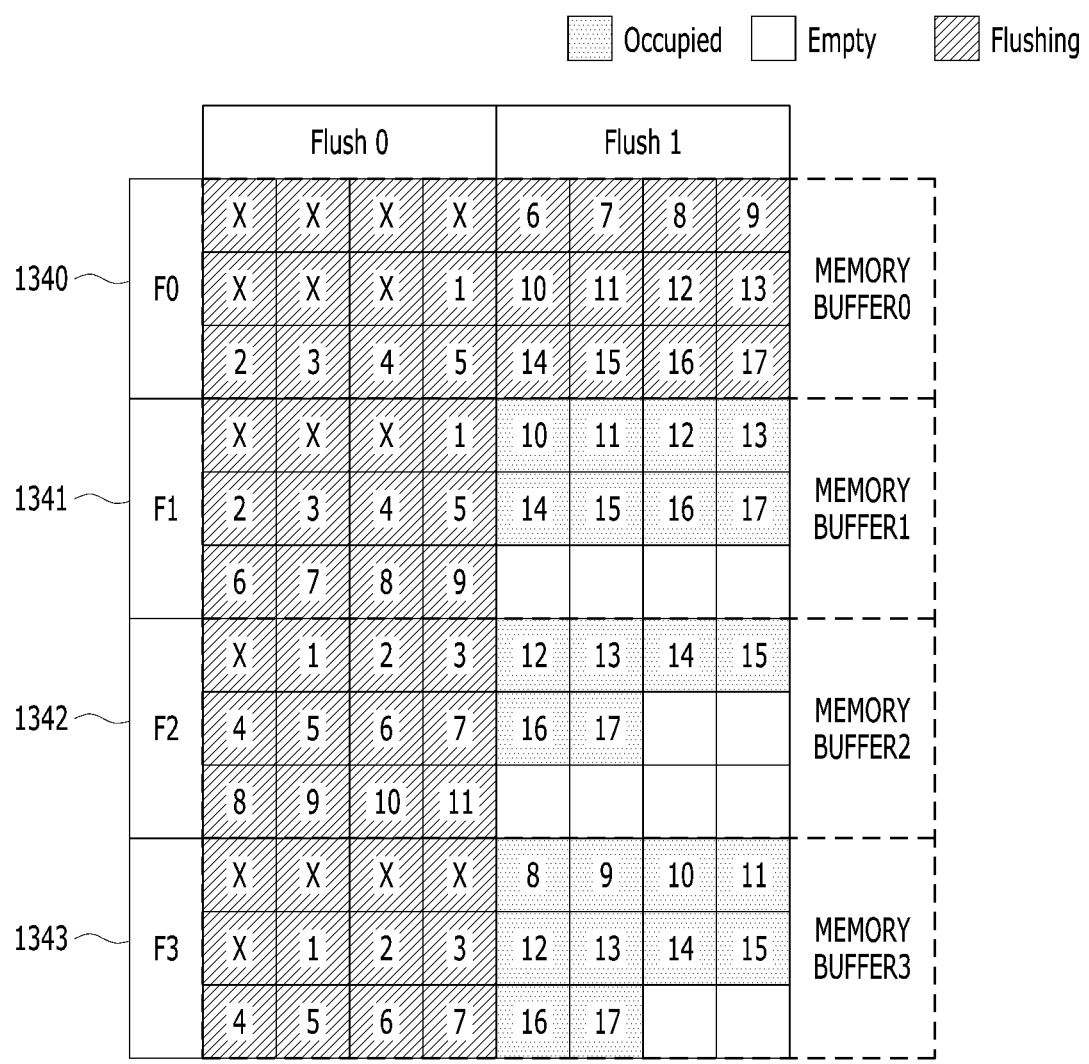

FIG. 1C illustrates the case in which write data having a larger size than the threshold size are serially inputted from the host 102 in the above-described state of FIG. 1B, and proportionally buffered into the plurality of memory buffer regions MEMORY BUFFER0 to MEMORY BUFFER3, respectively. That is, FIG. 1C illustrates the case in which the write data having a larger size than the threshold size are serially inputted from the host 102 while the sizes of the write data buffered in the respective memory buffer regions MEMORY BUFFER0 to MEMORY BUFFER3 have large differences from one another as illustrated in FIG. 1B, and proportionally buffered into the respective memory buffer regions MEMORY BUFFER0 to MEMORY BUFFER3. For example, as illustrated in FIG. 1C, 68 pieces of write data may be serially inputted from the host 102, and then proportionally buffered into the respective memory buffer regions MEMORY BUFFER0 to MEMORY BUFFER3 by 17 pieces of data. Therefore, since the 68 pieces of write data are additionally buffered into the plurality of memory buffer regions MEMORY BUFFER0 to MEMORY BUFFER3 in which the 16 pieces of write data have been already buffered as described with reference to FIG. 1B, a total of 84 pieces of write data may be buffered. Among the 68 pieces of write data, 24 pieces of write data may be buffered in the first memory buffer region MEMORY BUFFER0, 20 pieces of write data may be buffered in the second memory buffer region MEMORY BUFFER1, 18 pieces of write data may be buffered in the third memory buffer region MEMORY BUFFER2, and 22 pieces of write data may be buffered in the fourth memory buffer region MEMORY BUFFER3.

In this way, the sizes of the write data buffered in the respective memory buffer regions MEMORY BUFFER0 to MEMORY BUFFER3 may be all larger than the threshold size of 12.

In particular, the first memory buffer region MEMORY BUFFER0, in which the largest pieces of write data, i.e. seven pieces of write data, have been buffered in FIG. 1B, may buffer 12 pieces of write data corresponding to the threshold size therein for the first time, at the time that fifth write data 5 is buffered into each of the memory buffer regions MEMORY BUFFER0 to MEMORY BUFFER3. Thus, the first sub controller 1340 may perform a flush operation F0/FLUSH0 on the first memory buffer region MEMORY BUFFER0 for the first time. That is, the first sub controller 1340 may perform an operation of programming the write data of the threshold size from the first memory buffer region MEMORY BUFFER0 to the first memory device group 1500 for the first time.

Then, the fourth memory buffer region MEMORY BUFFER3, in which the second largest number of pieces of write data, i.e. five pieces of write data, have been buffered in FIG. 1B, may buffer write data corresponding to the threshold size therein for the second time, at the time that seventh write data 7 is buffered into each of the memory buffer regions MEMORY BUFFER0 to MEMORY BUFFER3. Thus, the fourth sub controller 1343 may perform a flush operation F3/FLUSH0 on the fourth memory buffer region MEMORY BUFFER3 for the second time. That is, the fourth sub controller 1343 may perform an operation of programming the write data of the threshold size from the fourth memory buffer region MEMORY BUFFER3 to the fourth memory device group 1503 for the second time.

Then, the second memory buffer region MEMORY BUFFER1, in which the third largest number of pieces of write data, i.e. three pieces of write data, have been buffered in FIG. 1B, may buffer write data corresponding to the threshold size therein for the third time, at the time that ninth write data 9 is buffered into each of the memory buffer regions MEMORY BUFFER0 to MEMORY BUFFER3. Thus, the second sub controller 1341 may perform a flush operation F1/FLUSH0 on the second memory buffer region MEMORY BUFFER1 for the third time. That is, the second sub controller 1341 may perform an operation of programming the write data of the threshold size from the second memory buffer region MEMORY BUFFER1 to the second memory device group 1501 for the third time.

Then, the third memory buffer region MEMORY BUFFER2, in which the fourth largest number of pieces of write data, i.e. one pieces of write data, has been buffered in FIG. 1B, may buffer write data corresponding to the threshold size therein for the fourth time, at the time that 11th write data 11 is buffered into each of the memory buffer regions MEMORY BUFFER0 to MEMORY BUFFER3. Thus, the third sub controller 1342 may perform a flush operation F2/FLUSH0 on the third memory buffer region MEMORY BUFFER2 for the fourth time. That is, the third sub controller 1342 may perform an operation of programming the write data of the threshold size from the third memory buffer region MEMORY BUFFER2 to the third memory device group 1502 for the fourth time.

In this way, since the plurality of memory buffer regions MEMORY BUFFER0 to MEMORY BUFFER3 have empty spaces regardless of the flush operations F0 to F3/FLUSH0 performed on the respective memory buffer regions MEMORY BUFFER0 to MEMORY BUFFER3, write data may be continuously inputted from the host 102 and buffered into the host buffer region HOST BUFFER, and then allocated to the respective memory buffer regions MEMORY BUFFER0 to MEMORY BUFFER3.

Therefore, the first memory buffer region MEMORY BUFFER0 may buffer 12 pieces of write data corresponding to the threshold size once again at the time that 17th write data 17 is buffered into each of the memory buffer regions MEMORY BUFFER0 to MEMORY BUFFER3, regardless of the above-described first flush operation F0/FLUSH0. Thus, the first sub controller 1340 may perform a second flush operation F0/FLUSH1 on the first memory buffer region MEMORY BUFFER0 for the fifth time. That is, the first sub controller 1340 may perform an operation of programming the 12 pieces of write data (i.e., the write data of the threshold size) from the first memory buffer region MEMORY BUFFER0 to the first memory device group 1500, following the operation of programming the first 12 pieces of write data (i.e., the write data of the threshold size) to the first memory device group 1500.

Since the flush operations performed on the plurality of memory buffer regions MEMORY BUFFER0 to MEMORY BUFFER3 indicate program operations for the respective memory device groups 1500 to 1503, the flush operation may require a longer time than the operation of buffering write data. That is, the speed at which write data are buffered in each of the memory buffer regions MEMORY BUFFER0 to MEMORY BUFFER3 may be higher than the speed of the flush operation performed on each of the memory buffer regions MEMORY BUFFER0 to MEMORY BUFFER3.

Therefore, the first flush operation F0/FLUSH0 for the first memory buffer region MEMORY BUFFER0 may not be completed even at the time that the second flush operation F0/FLUSH1 is started in the first memory buffer region MEMORY BUFFER0. That is, until the first flush operation F0/FLUSH0 for the first memory buffer region MEMORY BUFFER0 is completed, the first memory buffer region MEMORY BUFFER0 may have no more space into which write data can be buffered. When the first memory buffer region MEMORY BUFFER0 has no more space into which write data can be buffered, the buffering operations of write data on the other second to fourth memory buffer regions MEMORY BUFFER1 to MEMORY BUFFER3 may also be stopped.

In other words, until the first flush operation F0/FLUSH0 for the first memory buffer region MEMORY BUFFER0 is completed so that the first memory buffer region MEMORY BUFFER0 has an empty space, the operations of buffering write data into the second to fourth memory buffer regions MEMORY BUFFER1 to MEMORY BUFFER3 may be stopped. For example, until the first flush operation F0/FLUSH0 for the first memory buffer region MEMORY BUFFER0 is completed so that the first memory buffer region MEMORY BUFFER0 has an empty space as illustrated in FIG. 1C, the state in which the 17th write data 17 is buffered in each of the second to fourth memory buffer regions MEMORY BUFFER1 to MEMORY BUFFER3 may be maintained.

Figure 1D:
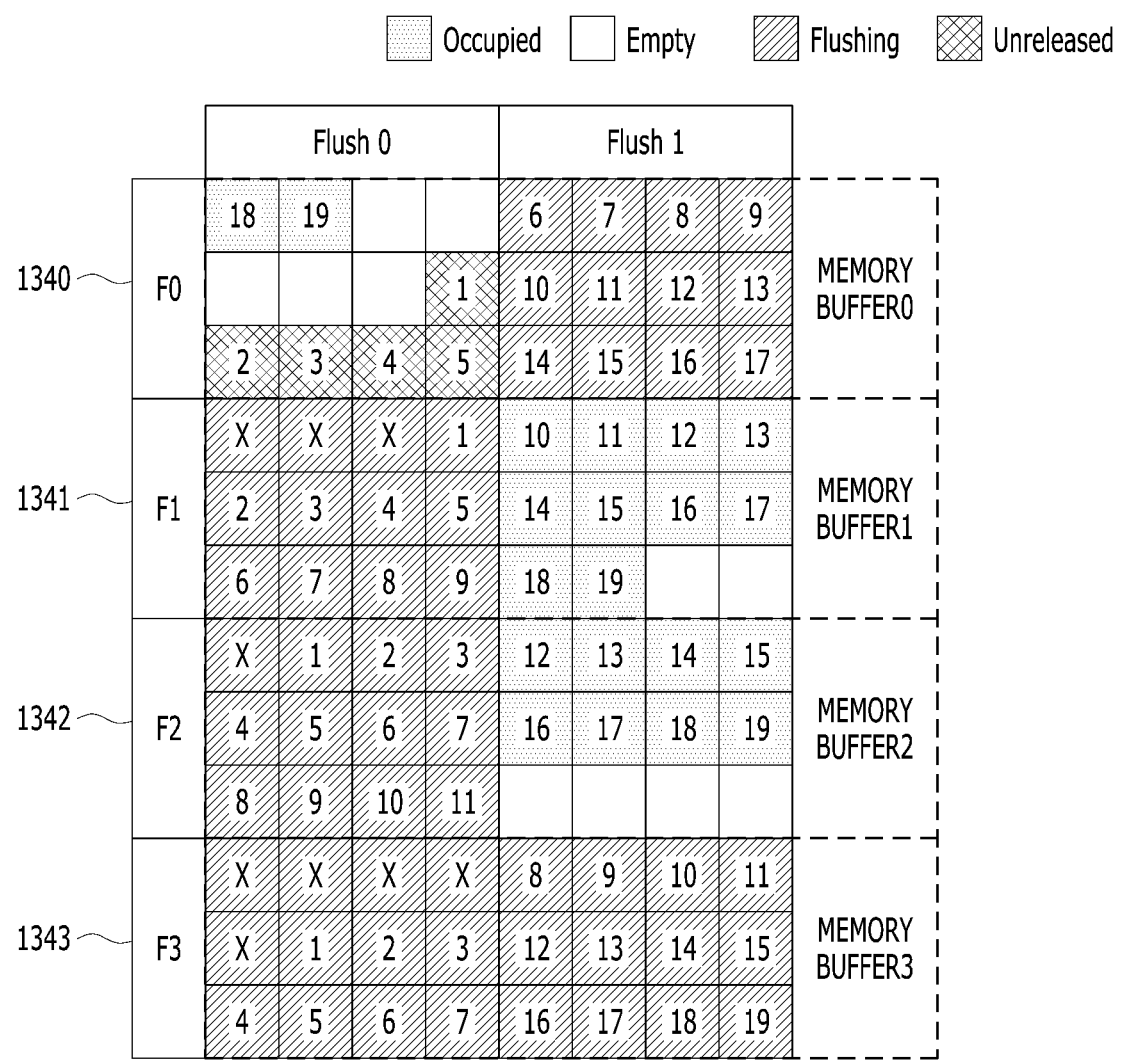

FIG. 1D illustrates the case in which the first flush operation F0/FLUSH0 for the first memory buffer region MEMORY BUFFER0 is completed in the above-described state of FIG. 1C such that the first memory buffer region MEMORY BUFFER0 has an empty space and then buffers write data from the host 102 again.

Specifically, the fourth memory buffer region MEMORY BUFFER3 may buffer the 12 pieces of write data (i.e., the write data of the threshold size) once again at the time that 19th write data 19 is buffered into each of the memory buffer regions MEMORY BUFFER0 to MEMORY BUFFER3, regardless of the above-described second flush operation F3/FLUSH0. 18th and 19th write data may be provided, to each of the memory buffer regions MEMORY BUFFER0 to MEMORY BUFFER3, as serial data subsequent to the 17th write data. Thus, the fourth sub controller 1343 may perform a second flush operation F3/FLUSH1 on the fourth memory buffer region MEMORY BUFFER3 for the sixth time. That is, the fourth sub controller 1343 may perform an operation of programming the 12 pieces of write data (i.e., the write data of the threshold size) from the fourth memory buffer region MEMORY BUFFER3 to the fourth memory device group 1503, following the operation of programming the first 12 pieces of write data (i.e., the write data of the threshold size) to the fourth memory device group 1503.

The first flush operation F3/FLUSH0 for the fourth memory buffer region MEMORY BUFFER3 may not yet be completed even at the time that the second flush operation F3/FLUSH1 is started in the fourth memory buffer region MEMORY BUFFER3. That is, until the first flush operation F3/FLUSH0 for the fourth memory buffer region MEMORY BUFFER3 is completed, the fourth memory buffer region MEMORY BUFFER3 may have no more space into which write data can be buffered. When the fourth memory buffer region MEMORY BUFFER3 has no more space into which write data can be buffered, the buffering operations of write data on the other first to third memory buffer regions MEMORY BUFFER0 to MEMORY BUFFER2 may also be stopped.

In other words, until the first flush operation F3/FLUSH0 for the fourth memory buffer region MEMORY BUFFER3 is completed so that the fourth memory buffer region MEMORY BUFFER3 has an empty space, the operations of buffering write data into the first to third memory buffer regions MEMORY BUFFER0 to MEMORY BUFFER2 may be stopped. For example, until the first flush operation F3/FLUSH0 for the fourth memory buffer region MEMORY BUFFER3 is completed so that the fourth memory buffer region MEMORY BUFFER3 has an empty space as illustrated in FIG. 1D, the state in which the 19th write data 19 is buffered in each of the first to third memory buffer regions MEMORY BUFFER0 to MEMORY BUFFER2 may be maintained.

Although the first flush operation F0/FLUSH0 for the first memory buffer region MEMORY BUFFER0 has been completed, some data, i.e., pieces 1 to 5, of the write data buffered in the first memory buffer region MEMORY BUFFER0 may be unreleased. This is because the flush operations F1 to F3/FLUSH0 for the second to fourth memory buffer regions MEMORY BUFFER1 to MEMORY BUFFER3 are not yet completed. In other words, since write data which are serially inputted from the host 102 are highly likely to be data associated with one another, the write data need to be not only proportionally buffered into the plurality of memory buffer regions MEMORY BUFFER0 to MEMORY BUFFER3, but also proportionally released from the plurality of memory buffer regions MEMORY BUFFER0 to MEMORY BUFFER3, for the sake of the reliability of the program operation.

Figure 1E:
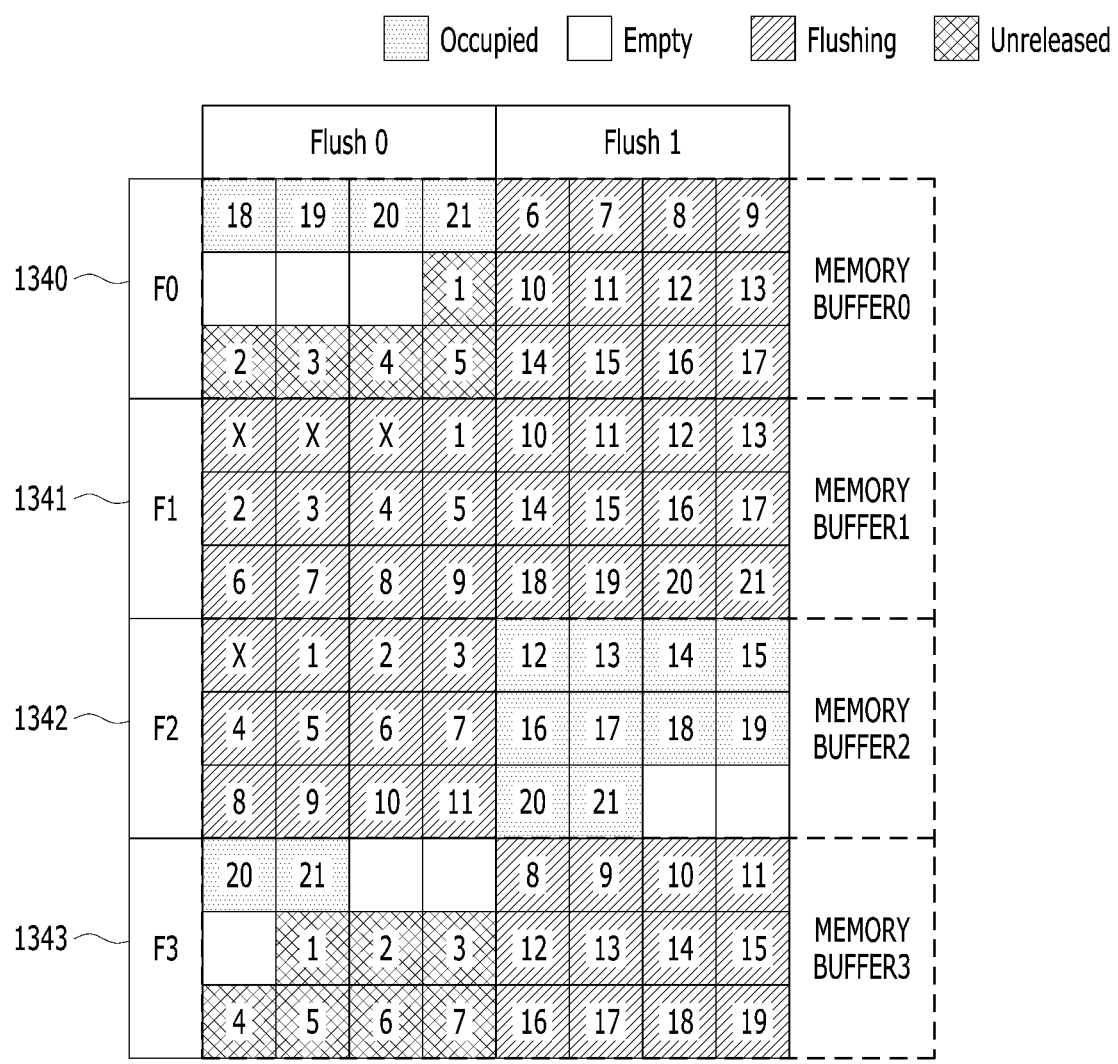

FIG. 1E illustrates the case in which the first flush operation F3/FLUSH0 for the fourth memory buffer region MEMORY BUFFER3 is completed in the above-described state of FIG. 1D, such that the fourth memory buffer region MEM ORY BUFFER3 has an empty space, and then buffers write data from the host 102 again.

Specifically, the second memory buffer region MEMORY BUFFER1 may buffer the 12 pieces of write data (i.e., the write data of the threshold size) once again at the time that 21st write data 21 is buffered into each of the memory buffer regions MEMORY BUFFER0 to MEMORY BUFFER3, regardless of the above-described third flush operation F1/FLUSH0. 20th and 21st write data may be provided, to each of the memory buffer regions MEMORY BUFFER0 to MEMORY BUFFER3, as serial data subsequent to the 19th write data. Thus, the second sub controller 1341 may perform a second flush operation F1/FLUSH1 on the second memory buffer region MEMORY BUFFER1 for the seventh time. That is, the second sub controller 1341 may perform an operation of programming the 12 pieces of write data (i.e., the write data of the threshold size) from the second memory buffer region MEMORY BUFFER1 to the second memory device group 1501, following after the operation of programming the first 12 pieces of write data (i.e., the write data of the threshold size) to the second memory device group 1501.

The first flush operation F1/FLUSH0 for the second memory buffer region MEMORY BUFFER1 may not yet be completed even at the time that the second flush operation F1/FLUSH1 is started in the second memory buffer region MEMORY BUFFER1. That is, until the first flush operation F1/FLUSH0 for the second memory buffer region MEMORY BUFFER1 is completed, the second memory buffer region MEMORY BUFFER1 may have no more space into which write data can be buffered. When the second memory buffer region MEMORY BUFFER1 has no more space into which write data can be buffered, the buffering operations of write data on the other first, third and fourth memory buffer regions MEMORY BUFFER0, MEMORY BUFFER2 and MEMORY BUFFER3 may also be stopped.

In other words, until the first flush operation F1/FLUSH0 for the second memory buffer region MEMORY BUFFER1 is completed so that the second memory buffer region MEMORY BUFFER1 has an empty space, the operations of buffering write data into the first, third and fourth memory buffer regions MEMORY BUFFER0, MEMORY BUFFER2 and MEMORY BUFFER3 may be stopped. For example, until the first flush operation F1/FLUSH0 for the second memory buffer region MEMORY BUFFER1 is completed so that the second memory buffer region MEMORY BUFFER1 has an empty space as illustrated in FIG. 1E, the state in which the 21st write data 21 is buffered in each of the first, third and fourth memory buffer regions MEMORY BUFFER0, MEMORY BUFFER2 and MEMORY BUFFER3 may be maintained.

Although the first flush operation F3/FLUSH0 for the fourth memory buffer region MEMORY BUFFER3 has been completed, some pieces of data 1 to 7 of the write data buffered in the fourth memory buffer region MEMORY BUFFER3 may be unreleased. This is because the flush operations F1 and F2/FLUSH0 for the second and third memory buffer regions MEMORY BUFFER1 and MEMORY BUFFER2 are not yet completed. In other words, since write data which are serially inputted from the host 102 are highly likely to be associated with one another, the write data need to be not only proportionally buffered into the plurality of memory buffer regions MEMORY BUFFER0 to MEMORY BUFFER3, but also proportionally released from the plurality of memory buffer regions MEMORY BUFFER0 to MEMORY BUFFER3, for the sake of the reliability of the program operation.

Figure 1F:
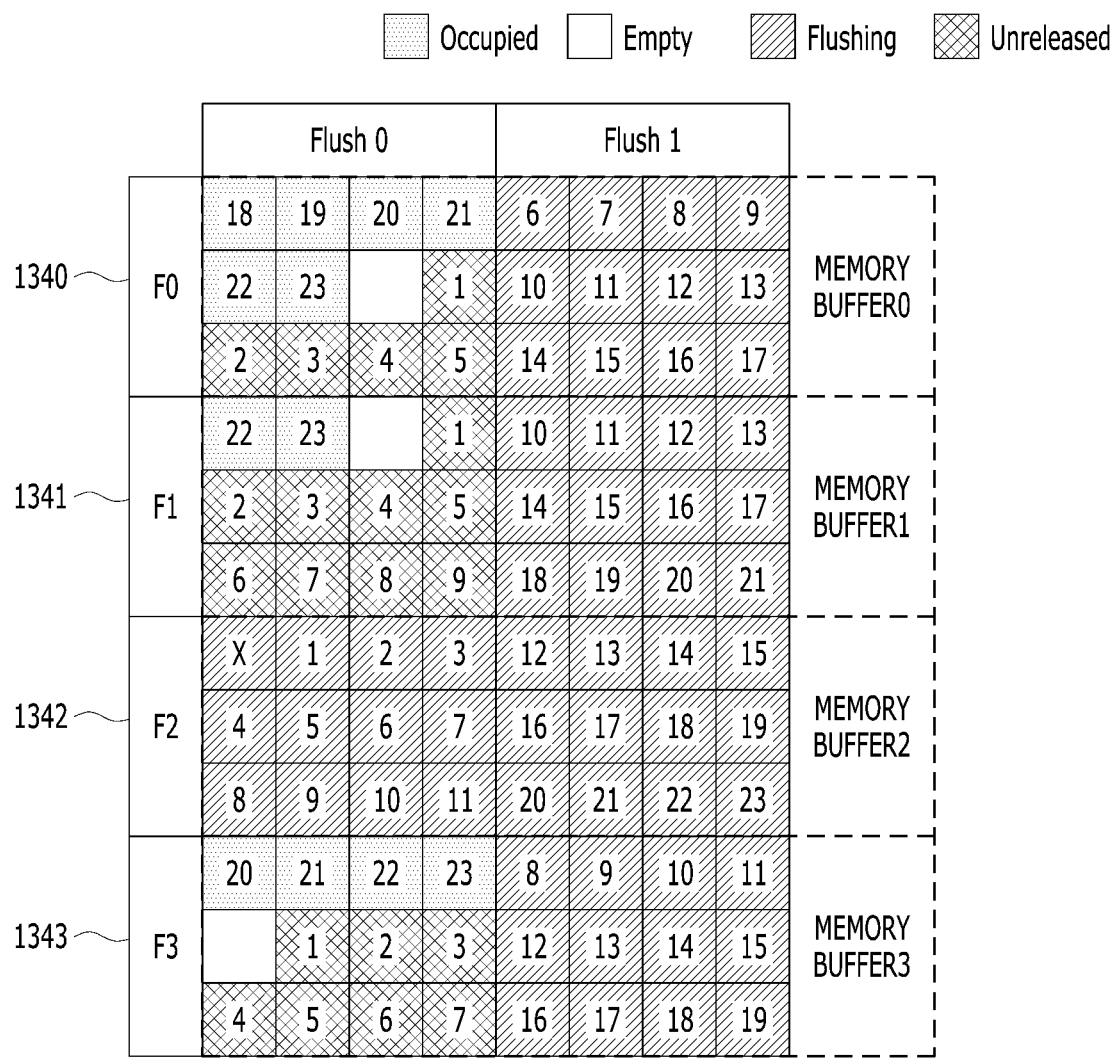

FIG. 1F illustrates the case in which the first flush operation F1/FLUSH0 for the second memory buffer region MEMORY BUFFER1 is completed in the above-described state of FIG. 1E, such that the second memory buffer region MEMORY BUFFER1 has an empty space and then buffers write data from the host 102 again.

Specifically, the third memory buffer region MEMORY BUFFER2 may buffer the 12 pieces of write data (i.e., the write data of the threshold size) once again at the time that 23rd write data 23 is buffered into each of the memory buffer regions MEMORY BUFFER0 to MEMORY BUFFER3, regardless of the above-described fourth flush operation F2/FLUSH0. 22nd and 23rd write data 22 and 23 may be provided, to each of the memory buffer regions MEMORY BUFFER0 to MEMORY BUFFER3, as serial data subsequent to the 21st write data 21. Thus, the third sub controller 1342 may perform a second flush operation F2/FLUSH1 on the third memory buffer region MEMORY BUFFER2 for the seventh time. That is, the third sub controller 1342 may perform an operation of programming the 12 pieces of write data (i.e., the write data of the threshold size) from the third memory buffer region MEMORY BUFFER2 to the third memory device group 1502, following the operation of programming the first 12 pieces of write data (i.e., the write data of the threshold size) to the third memory device group 1502.

The first flush operation F2/FLUSH0 for the third memory buffer region MEMORY BUFFER2 may not yet be completed even at the time that the second flush operation F2/FLUSH1 is started in the third memory buffer region MEMORY BUFFER2. That is, until the first flush operation F2/FLUSH0 for the third memory buffer region MEMORY BUFFER2 is completed, the third memory buffer region MEMORY BUFFER2 may have no more space into which write data can be buffered. When the third memory buffer region MEMORY BUFFER2 has no more space into which write data can be buffered, the buffering operations of write data on the other first, second and fourth memory buffer regions MEMORY BUFFER0, MEMORY BUFFER1 and MEMORY BUFFER3 may be stopped.

In other words, until the first flush operation F2/FLUSH0 for the third memory buffer region MEMORY BUFFER2 is completed so that the third memory buffer region MEMORY BUFFER2 has an empty space, the operations of buffering write data into the first, second and fourth memory buffer regions MEMORY BUFFER0, MEMORY BUFFER1 and MEMORY BUFFER3 may be stopped. For example, until the first flush operation F2/FLUSH0 for the third memory buffer region MEMORY BUFFER2 is completed so that the third memory buffer region MEMORY BUFFER2 has an empty space as illustrated in FIG. 1F, the state in which the 23rd write data 23 is buffered in each of the first, second and fourth memory buffer regions MEMORY BUFFER0, MEMORY BUFFER1 and MEMORY BUFFER3 may be maintained.

Although the first flush operation F1/FLUSH0 for the second memory buffer region MEMORY BUFFER1 has been completed, some pieces of data 1 to 9 of the write data buffered in the second memory buffer region MEMORY BUFFER1 may be unreleased. This is because the flush operation F2/FLUSH0 for the third memory buffer region MEMORY BUFFER2 is not yet completed. In other words, since write data which are serially inputted from the host 102 are highly likely to be data associated with one another, the write data need to be not only proportionally buffered into the plurality of memory buffer regions MEMORY BUFFER0 to MEMORY BUFFER3, but also proportionally released from the plurality of memory buffer regions MEMORY BUFFER0 to MEMORY BUFFER3, for the sake of the reliability of the program operation.

Figure 1G:
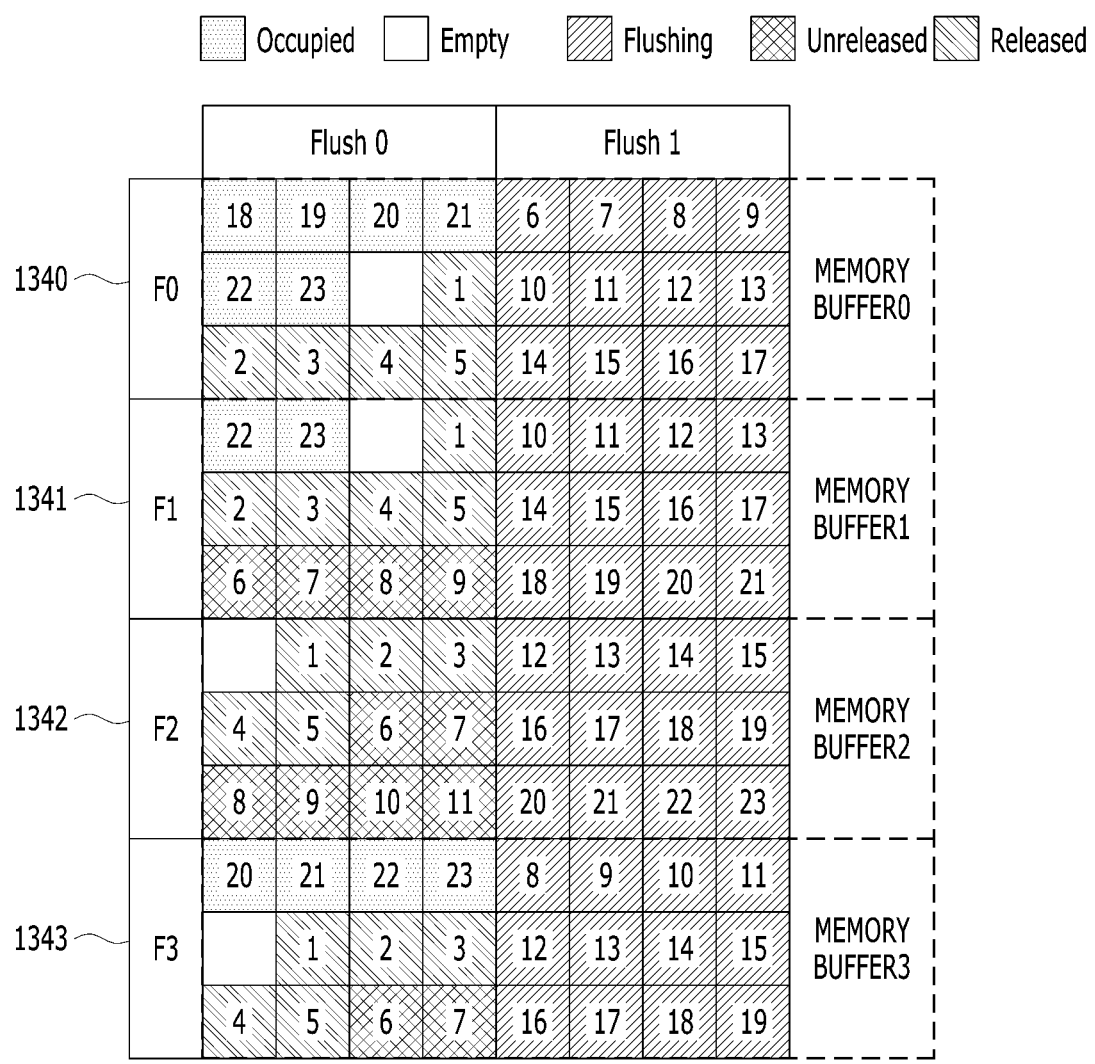

FIG. 1G illustrates that the first flush operation F2/FLUSH0 for the third memory buffer region MEMORY BUFFER2 is completed in the above-described state of FIG. 1F, such that the third memory buffer region MEMORY BUFFER2 has an empty space, and then some pieces of data, i.e., pieces 1 to 5, which are unreleased from the plurality of memory buffer regions MEMORY BUFFER0 to MEMORY BUFFER3 are released.

Specifically, as the first flush operation F2/FLUSH0 for the third memory buffer region MEMORY BUFFER2 is completed, the first flush operations F0, F1, F2 and F3/FLUSH0 for the respective memory buffer regions MEMORY BUFFER0 to MEMORY BUFFER3 may be all completed. Thus, the pieces of data 1 to 5 which have been completely flushed commonly from each of the memory buffer regions MEMORY BUFFER0 to MEMORY BUFFER3 may be released.

Among the write data buffered in the first memory buffer region MEMORY BUFFER0, the pieces of data 1 to 5 other than remaining pieces of data 18 to 23 which are still buffered and standing by to be flushed may be all released from the first memory buffer region MEMORY BUFFER0. On the other hand, some data, i.e., pieces 6 to 9, among the write data buffered in the second memory buffer region MEMORY BUFFER1, some data, i.e., pieces 6 to 11, among the write data buffered in the third memory buffer region MEMORY BUFFER2, and some data, i.e., pieces 6 and 7, among the write data buffered in the fourth memory buffer region MEMORY BUFFER3 may be unreleased even though the flush operations have been already completed on the data pieces 6 to 9 of the second memory buffer region MEMORY BUFFER1, the data pieces 6 to 11 of the third memory buffer region MEMORY BUFFER2, and the data pieces 6 and 7 of the fourth memory buffer region MEMORY BUFFER3. That is because the data pieces 6 to 9 of the second memory buffer region MEMORY BUFFER1, the data pieces 6 to 11 of the third memory buffer region MEMORY BUFFER2, and the data pieces 6 and 7 of the fourth memory buffer region MEMORY BUFFER3 are flushed not commonly but individually.

Since there are the data which have been already flushed from each of the memory buffer regions MEMORY BUFFER0 to MEMORY BUFFER3 but cannot be released, the spaces of the plurality of memory buffer regions MEMORY BUFFER0 to MEMORY BUFFER3, into which new data can be buffered, may have unbalanced states.

FIG. 1H illustrates the case in which the first memory buffer region MEMORY BUFFER0 can newly buffer 12 pieces of data because all of the completely flushed data have been released. However, the second memory buffer region MEMORY BUFFER1 can newly buffer 8 pieces of data because four pieces of data of the completely flushed data have not been released. Similarly, the third memory buffer region MEMORY BUFFER2 can newly buffer six pieces of data because six pieces of data of the flushed data have not been released. Furthermore, the fourth memory buffer region MEMORY BUFFER3 can newly buffer 10 pieces of data because two pieces of data of the completely flushed data have not been released.

Since the spaces of the plurality of memory buffer regions MEMORY BUFFER0 to MEMORY BUFFER3, into which new data can be buffered, have unbalanced states, the times that the flush operations are performed on the respective memory buffer regions MEMORY BUFFER0 to MEMORY BUFFER3 as illustrated in FIGS. 1C to 1F may be different from one another. Thus, some memory buffer regions of the memory buffer regions MEMORY BUFFER0 to MEMORY BUFFER3 may not buffer write data but need to wait, even though the some memory buffer regions have an empty space.

When write data having a smaller size than the threshold size and write data having a larger size than the threshold size are mixed and inputted in the case that the plurality of sub controllers 1340 to 1343 manage the plurality of memory buffer regions MEMORY BUFFER0 to MEMORY BUFFER3 according to a general method as described with reference to FIGS. 1B to 1H, buffering operations for the write data having a larger size than the threshold size may be delayed because the write data having a smaller size than the threshold size are disproportionately buffered into the plurality of memory buffer regions MEMORY BUFFER0 to MEMORY BUFFER3.

Figure 1I:
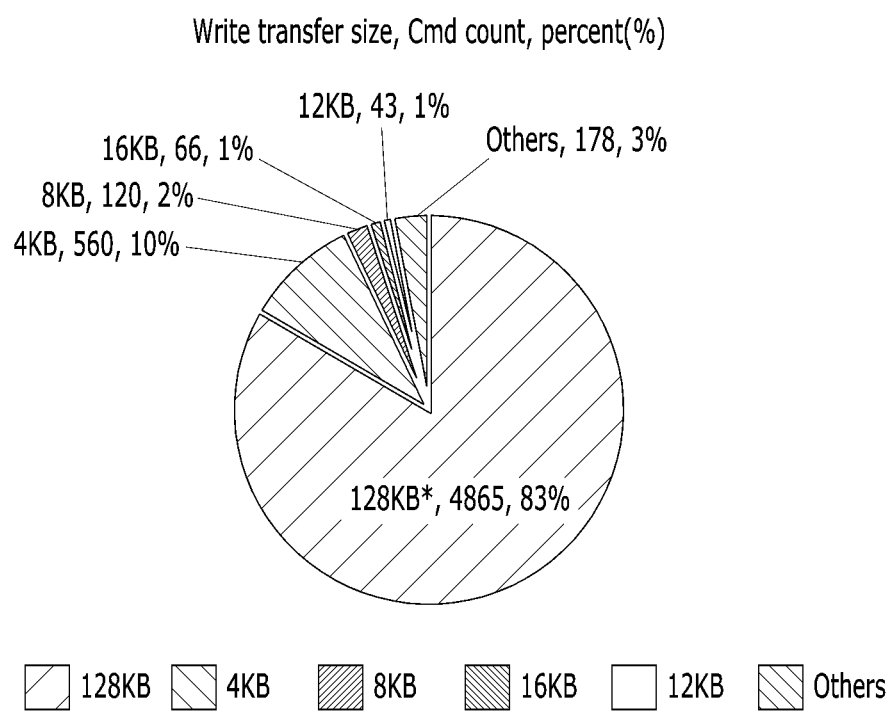
Figure 1J:
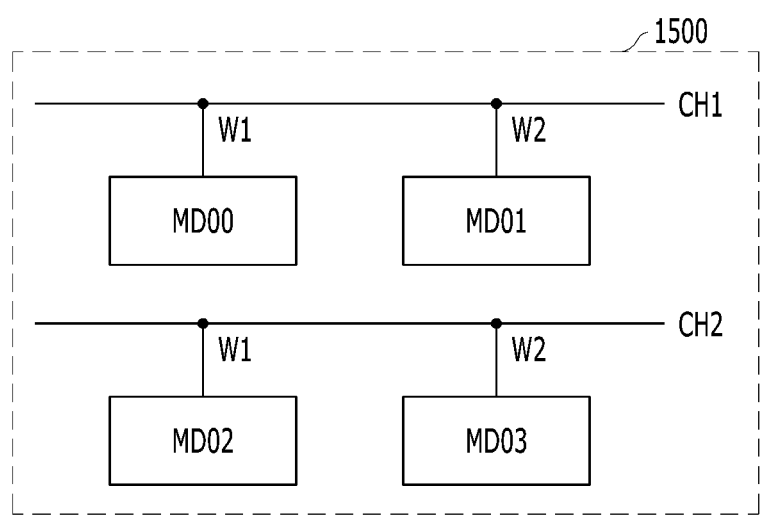

For reference, FIG. 1I shows the data ratio of a general memory system in which the ratio of write data which have a smaller size than the threshold size and are randomly inputted is 17%, and the ratio of write data which have a larger size than the threshold size and are serially inputted is 83%. That is, when the buffering operations for the write data having a larger size than the threshold size are delayed because the write data having a smaller size than the threshold size are disproportionately buffered into the plurality of memory buffer regions MEMORY BUFFER0 to MEMORY BUFFER3, the entire throughput of the memory system 110 may be degraded.

Figure 2:
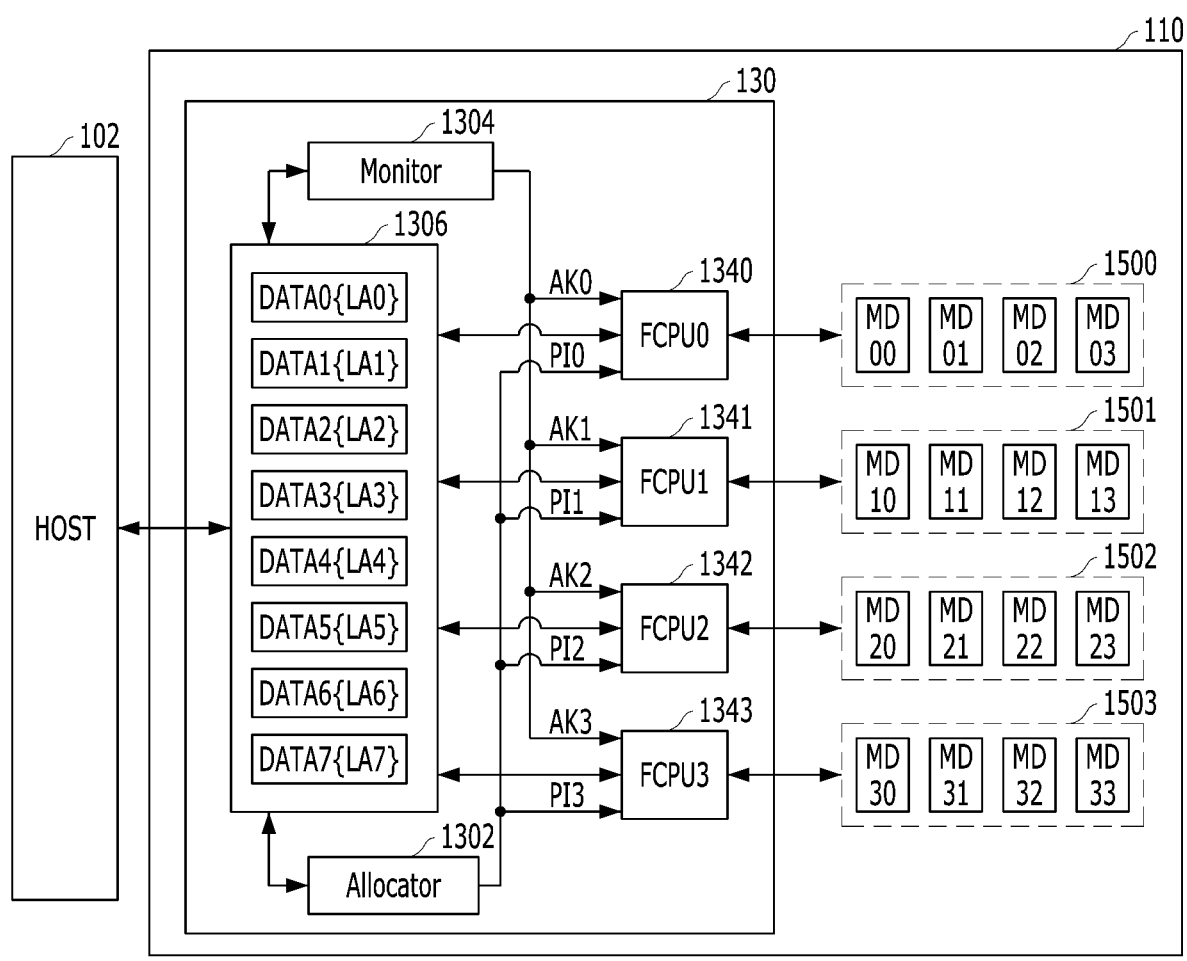
FIG. 2 is a diagram for describing a memory system in accordance with an embodiment.

FIG. 2 is a diagram for describing a memory system in accordance with an embodiment.

Referring to FIG. 2, the memory system 110 in accordance with the present embodiment may include a controller 130 and a plurality of memory devices MD<00, 01, 02, 03, 10, 11, 12, 13, 20, 21, 22, 23, 30, 31, 32, 33>. The controller 130 may control the plurality of memory devices MD<00, 01, 02, . . . , 32, 33> to output data requested by a host 102, or control the plurality of memory devices MD<00, 01, 02, . . . , 32, 33> to store data transferred from the host 102. Furthermore, the controller 130 may internally generate data, for managing an operation of storing or outputting data of the host 102, and store or output the generated data in or to the plurality of memory devices MD<00, 01, 02, . . . , 32, 33>. Each of the memory devices MD<00, 01, 02, . . . , 32, 33> may include a plurality of blocks (not illustrated), each including a plurality of cells capable of storing data therein. The internal configurations of the plurality of memory devices MD<00, 01, 02, . . . , 32, 33> may be changed according to the characteristics of the respective memory devices MD<00, 01, 02, . . . , 32, 33>, the purpose of use of the memory system 110, or the specification of the memory system 110, requested by the host 102.

Specifically, the controller 130 may further include a buffer memory 1306 for buffering write data DATA0 to DATA7 inputted from the host 102. For reference, the buffer memory 1306 may be included in the controller 130 as illustrated in FIG. 2, or may be a separate component within the memory system 110.

The controller 130 may classify the write data DATA0 to DATA7, buffered in the buffer memory 1306, into a plurality of data groups according to logical addresses LA0 to LA7 corresponding to the write data DATA0 to DATA7. When size differences between the respective data groups buffered in the buffer memory 1306 exceed a set size difference, the controller 130 may select at least data group among the plurality of data groups, and forcibly flush the selected data group to the plurality of memory devices MD<00, 01, 02, . . . , 32, 33>. That is, the controller 130 may manage the buffer memory 1306 such that the size differences between the respective data groups buffered in the buffer memory 1306 are maintained within the set size difference. For this operation, the controller 130 may select a data group having a size larger by a set size or more than the data group having the smallest size, among the plurality of data groups buffered in the buffer memory 1306, and forcibly flush at least some of the data in the selected data group to the plurality of memory devices MD<00, 01, 02, . . . , 32, 33>. The controller 130 may select the appropriate number of pieces of data in the selected data group to reduce the size difference between the selected data group and the smallest sized data group to be less than the set size, and forcibly flush the selected pieces of data to the plurality of memory devices MD<00, 01, 02, . . . , 32, 33>.

More specifically, the controller 130 may include the buffer memory 1306, a plurality of sub controllers 1340 to 1343, an allocator 1302 and a monitor 1304. The plurality of memory devices MD<00, 01, 02, . . . , 32, 33> may be divided into a plurality of memory groups 1500 to 1503. For example, as illustrated in FIG. 2, four memory devices MD<00, 01, 02, 03>, MD<10, 11, 12, 13>, MD<20, 21, 22, 23> or MD<30, 31, 32, 33> may form memory device groups 1500, 1501, 1502 and 1503, respectively.

The plurality of sub controllers 1340 to 1343 may correspond to the plurality of memory device groups 1500 to 1503, respectively. The plurality of sub controllers 1340 to 1343 may independently control operations on the respective memory device groups 1500 to 1503, for example, read/write/erase operations.

For example, the first sub controller FCPU0 1340 corresponding to the first memory device group 1500 may control operations on each of the plurality of memory devices MD<00, 01, 02, 03> in the first memory device group 1500. The second sub controller FCPU1 1341 corresponding to the second memory device group 1501 may control operations on each of the plurality of memory devices MD<10, 11, 12, 13> in the second memory device group 1501. The third sub controller FCPU2 1342 corresponding to the third memory device group 1502 may control operations on each of the plurality of memory devices MD<20, 21, 22, 23> in the third memory device group 1502. The fourth sub controller FCPU3 1343 corresponding to the fourth memory device group 1503 may control operations on each of the plurality of memory devices MD<30, 31, 32, 33> in the fourth memory device group 1503.

The plurality of sub controllers 1340 to 1343 may be coupled to the plurality of memory device groups 1500 to 1503, respectively, through a plurality of data paths. For example, as illustrated in FIG. 1J, each of the plurality of memory devices MD<00, 01, 02, 03> included in the first memory device group 1500 may be coupled to the first sub controller 1340 through different paths. Among the plurality of memory devices MD<00, 01, 02, 03>, the first memory device MD00 may be coupled to the first sub controller 1340 through a first channel and a first way, the second memory device MD01 may be coupled to the first sub controller 1340 through the first channel and a second way, the third memory device MD02 may be coupled to the first sub controller 1340 through a second channel and a first way, and the fourth memory device MD03 may be coupled to the first sub controller 1340 through the second channel and a second way. Thus, the second to fourth memory device groups 1501 to 1503 may be coupled to the second to fourth sub controllers, respectively, through a plurality of data paths. The number of channels and ways for coupling the plurality of sub controllers 1340 to 1343 to the respective memory device groups 1500 to 1503 may be changed according to the purpose of use of the memory system 110 or the specification of the memory system 110, required by the host 102.

The buffer memory 1306 may buffer commands and data inputted/outputted between the host 102 and the plurality of sub controllers 1340 to 1343. Specifically, while the plurality of sub controllers 1340 to 1343 control the plurality of memory device groups 1500 to 1503 in response to a request from the host 102, the buffer memory 1306 may temporarily store data read from the plurality of memory device groups 1500 to 1503, before the read data are provided to the host 102. The plurality of sub controllers 1340 to 1343 may temporarily store data provided from the host 102 in the buffer memory 1306, before storing the data in the plurality of memory device groups 1500 to 1503. Furthermore, data which the plurality of sub controllers 1340 to 1343 generate in order to control read, write and erase operations of the plurality of memory device groups 1500 to 1503 may be stored in the buffer memory 1306.

In particular, the buffer memory 1306 may be used to buffer write data inputted from the host 102, before the write data are written to the plurality of memory device groups 1500 to 1503.

Specifically, the plural pieces of write data DATA0 to DATA7 inputted from the host 102 may be buffered into the buffer memory 1306 according to the order in which the data are inputted. Referring to FIGS. 1A and 2, the plural pieces of write data DATA0 to DATA7 inputted from the host 102 may be buffered into a host buffer region HOST BUFFER of the buffer memory 1306 according to the order in which the data are inputted.

In this way, the plural pieces of write data DATA0 to DATA7 buffered in the buffer memory 1306 may be grouped into a plurality of data groups corresponding to the respective sub controllers 1340 to 1343 by the allocator 1302. Referring to FIGS. 1A and 2, the plural pieces of write data DATA0 to DATA7 buffered in the host buffer region HOST BUFFER may be divided and buffered into a plurality of memory buffer regions MEMORY BUFFER0 to MEMORY BUFFER3 corresponding to the respective sub controllers 1340 to 1343 by the allocator 1302.

The allocator 1302 may check logical addresses LA0 to LA7 of the write data DATA0 to DATA7 buffered in the buffer memory 1306, divide the write data into a plurality of data groups according to the logical addresses, and then allocate the plurality of data groups to the respective sub controllers 1340 to 1343. Referring to FIGS. 1A and 2, the allocator 1302 may check the logical addresses corresponding to the plural pieces of write data buffered in the host buffer region HOST BUFFER, and group the write data into a plurality of data groups according to the check result. Furthermore, the allocator 1302 may allocate the plurality of data groups to the respective memory buffer regions MEMORY BUFFER0 to MEMORY BUFFER3. For example, among the plural pieces of write data buffered in the host buffer region HOST BUFFER, the allocator 1302 may group data with logical address values ranging from 0 to 100 into a first data group, group data with logical address values ranging from 101 to 200 into a second data group, group data with logical address values ranging from 201 to 300 into a third data group, and group data with logical address values ranging from 301 to 400 into a fourth data group. Furthermore, the allocator 1302 may allocate the write data included in the first data group to the first memory buffer region MEMORY BUFFER0, allocate the write data included in the second data group to the second memory buffer region MEMORY BUFFER1, allocate the write data included in the third data group to the third memory buffer region MEMORY BUFFER2, and allocate the write data included in the fourth data group to the fourth memory buffer region MEMORY BUFFER3.

The operation of the allocator 1302 to allocate the plurality of data groups buffered in the buffer memory 1306 to the respective sub controllers 1340 to 1343 may be performed through an operation of transferring physical position information PI0 to PI3 of data within the buffer memory 1306 to the respective sub controllers 1340 to 1343 corresponding to the respective data groups, the data being included in the respective data groups. Referring to FIGS. 1A and 2, the allocator 1302 may group the physical position information PI0 to PI3 of the plural pieces of write data, buffered in the host buffer region HOST BUFFER, within the buffer memory 1306 into the plurality of data groups, and then transfer the plurality of data groups to the respective sub controllers 1340 to 1343 corresponding to the respective data groups, in order to allocate the plurality of data groups to the respective memory buffer regions MEMORY BUFFER0 to MEMORY BUFFER3. That is, the host buffer region HOST BUFFER and the memory buffer regions MEMORY BUFFER0 to MEMORY BUFFER3 may have physically the same position information. However, since the physical position information PI0 to PI3 within the buffer memory 1306, corresponding to the host buffer region HOST BUFFER, is not yet transferred to the plurality of sub controllers 1340 to 1343, it may be considered that the write data buffered in the host buffer region HOST BUFFER are not yet allocated to the plurality of sub controllers 1340 to 1343. On the other hand, since the physical position information PI0 to PI3 within the buffer memory 1306, corresponding to the plurality of memory buffer regions MEMORY BUFFER0 to MEMORY BUFFER3, has been already transferred to the plurality of sub controllers 1340 to 1343, it may be considered that the plurality of data groups buffered in the plurality of memory buffer regions MEMORY BUFFER0 to MEMORY BUFFER3 are allocated to the respective sub controllers 1340 to 1343.

The monitor 1304 may monitor size differences between the respective data groups buffered in the buffer memory 1306. That is, the monitor 1304 may check the sizes of the plurality of data groups buffered in the buffer memory 1306, select a data group having a larger size by a set size or more than the data group having the smallest size as a result of the check, and transmit an acknowledgement signal AK0, AK1, AK2 or AK3 to the sub controller 1340, 1341, 1342 or 1343 to which the selected data group is allocated. For example, when the result obtained by checking the sizes of the plurality of data groups buffered in the buffer memory 1306 indicates that the third data group has the smallest size, the monitor 1304 may check whether there is a data group having a size larger by the set size or more than the third data group. When the size of the first data group is larger by the set size or more than the size of the third data group, the monitor 1304 may select the first data group, and transmit the acknowledgement signal AK0 to the first sub controller 1340 to which the first data group is allocated.

The monitor 1304 may detect memory usage, i.e., how much in terms of percentage each of the plurality of data groups buffered in the buffer memory 1306 occupies relative to the total memory capacity, and determine the relative sizes of the plurality of data groups through the detected memory usages. For example, the result obtained by detecting the memory usages of the respective data groups, buffered in the buffer memory 1306, in the buffer memory 1306 may show that the first data group occupies 15%, the second data group occupies 2%, the third data group occupies 0%, the third data group occupies 8%, and 75% of the buffer memory 1306 may be empty space. In this case, the data group having the smallest size is the third data group, and the data group having the largest size is the first data group. Furthermore, the size difference between the first and third data groups is 15%. When it is assumed that the set size is 10%, the first data group has a size larger by the set size or more than the third data group. Therefore, the monitor 1304 may select the first data group, and transmit the acknowledgement signal AK0 to the first sub controller 1340 to which the first data group is allocated.

The plurality of sub controllers 1340 to 1343 may program the plurality of data groups buffered in the buffer memory 1306 to the respective memory device groups 1500 to 1503.

Specifically, when the acknowledgement signals AK0 to AK3 are not transmitted from the monitor 1304, each of the sub controllers 1340 to 1343 may flush the data group, which is buffered in the buffer memory 1306 and allocated thereto, by a threshold size, and program the flushed data group to the memory device group allocated thereto.

When the acknowledgement signals AK0 to AK3 are transmitted from the monitor 1304, each of the sub controllers 1340 to 1343 may forcibly flush at least some of data included in the data group which is buffered in the buffer memory 1306 and allocated thereto, and program the flushed data to the memory device group allocated thereto. At this time, the sizes of the data which are forcibly flushed to the respective memory device groups 1500 to 1503 by the plurality of sub controllers 1340 to 1343 may be smaller than the threshold size. Therefore, the plurality of memory devices MD<00, 01, 02, . . . , 32, 33> included in the respective memory device groups 1500 to 1503 may generate a threshold size of data by padding dummy data to data which are inputted from the sub controllers for program operations and have a smaller size than the threshold size, and then perform the program operation on the dummy-padded data of the threshold size.

When the acknowledgement signals AK0 to AK3 are transmitted from the monitor 1304, each of the sub controllers 1340 to 1343 may pad dummy data to at least some of data included in the data group which is buffered in the buffer memory 1306 and allocated thereto, flush, and program the flushed data to the memory device group allocate thereto.

Figure 3:
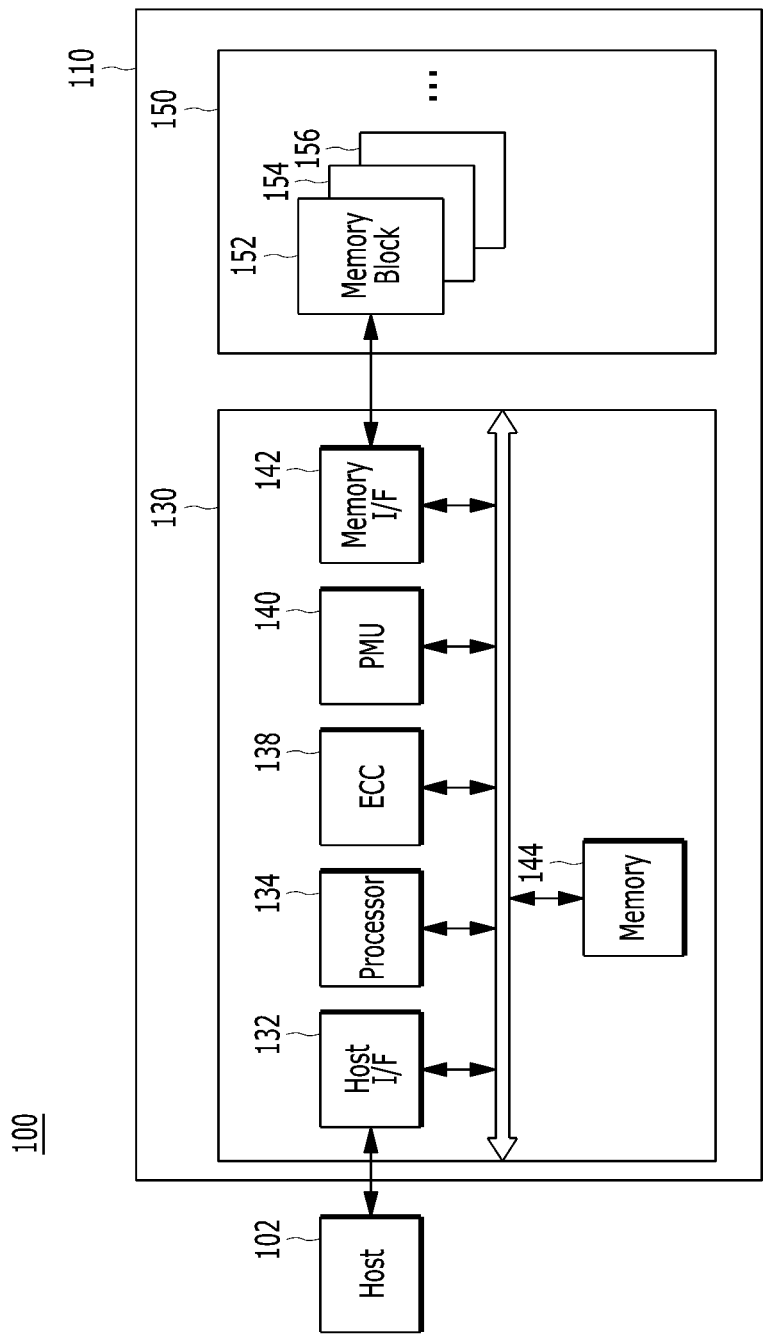
FIG. 3 is a diagram for describing an example of a data processing system including a memory system in accordance with an embodiment.

FIG. 3 is a block diagram illustrating a data processing system including a memory system in accordance with an embodiment of the present invention.

Referring to FIG. 3, the data processing system 100 may include a host 102 engaged or operably coupled with a memory system 110.

The host 102 may include any of a variety of portable electronic devices, such as a mobile phone, an MP3 player and a laptop computer, or an electronic device such as a desktop computer, a game player, a television (TV), a projector and the like.

The host 102 also includes at least one operating system (OS), which can generally manage, and control, functions and operations performed in the host 102. The OS may provide interoperability between the host 102 engaged with the memory system 110 and the user of the memory system 110. The OS may support functions and operations corresponding to user's requests. By way of example but not limitation, the OS may include a general operating system and a mobile operating system according to mobility of the host 102. The general operating system may be split into a personal operating system and an enterprise operating system according to system requirements or user's environment. The personal operating system, including Windows and Chrome, may be subject to support services for general purposes. The enterprise operating systems may be specialized for securing and supporting high performance, including Windows servers, Linux and Unix. Further, the mobile operating system may include an Android and iOS. The mobile operating system may be subject to support services or functions for mobility (e.g., a power saving function). The host 102 may include a plurality of operating systems. The host 102 may execute multiple operating systems in cooperation with the memory system 110, corresponding to a user's request. The host 102 may transmit a plurality of commands corresponding to the user's requests into the memory system 110, thereby performing operations corresponding to commands within the memory system 110. Handling plural commands in the memory system 110 is described below with reference to FIGS. 4 and 5.

The memory system 110 may perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card and a memory stick.

The storage devices for the memory system 110 may be implemented with a volatile memory device, for example, a dynamic random access memory (DRAM) or a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) or a flash memory.

The memory system 110 may include a controller 130 and a memory device 150. The memory device 150 may store data to be accessed by the host 102. The controller 130 may control storage of data in the memory device 150. Each of the plurality of memory devices MD<00, 01, 02, . . . , 32, 33> described above with reference to FIGS. 1A to 1J and 2 may be implemented as the memory device 150.

The controller 130 and the memory device 150 may be integrated into a single semiconductor device, which may be included in any of the various types of memory systems as described above.

By way of example but not limitation, the controller 130 and the memory device 150 may be integrated into a single semiconductor device. The controller 130 and memory device 150 may be integrated to form an SSD with improved operation speed. When the memory system 110 is used as an SSD, the operating speed of a host 102 connected to the memory system 110 can be improved more than that of a host 102 connected with a hard disk. In another embodiment, the controller 130 and the memory device 150 may be integrated into one semiconductor device to form a memory card, such as a PC card (PCMCIA), a compact flash card (CF), a smart media card (e.g., SM, SMC), a memory stick, a multimedia card (e.g., MMC, RS-MMC, MMCmicro), a secure digital (SD) card (e.g., SD, miniSD, microSD, SDHC), or a universal flash memory.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while electrical power is not supplied. The memory device 150 may store data provided from the host 102 through a write operation, while providing data stored therein to the host 102 through a read operation. The memory device 150 may include a plurality of memory blocks 152, 154, 156, each of which may include a plurality of pages. Each of the plurality of pages may include a plurality of memory cells to which a plurality of word lines (WL) are electrically coupled. The memory device 150 also includes a plurality of memory dies, each of which includes a plurality of planes, each of which includes memory blocks, among the plurality of memory blocks 152, 154, 156. In addition, the memory device 150 may be a non-volatile memory device, for example a flash memory, and the flash memory may have a three-dimensional stack structure.

For reference, each of the memory devices MD<00, 01, 02, . . . , 32, 33> described with reference to FIGS. 1A to 1J and 2 may be configured in a similar manner to the memory device 150 of FIG. 3. That is, each of the memory devices MD<00, 01, 02, . . . , 32, 33> may include a plurality of memory blocks.

The controller 130 may control overall operations of the memory device 150, such as read, write, program and erase operations. For example, the controller 130 may control the memory device 150 in response to a request from the host 102. The controller 130 may provide data, read from the memory device 150 to the host 102. The controller 130 may store data provided by the host 102 into the memory device 150.

The controller 130 may include a host interface (I/F) 132, a processor 134, error correction code (ECC) unit 138, a power management unit (PMU) 140, a memory interface (I/F) 142 and a memory 144, all operatively coupled via an internal bus.

The host interface 132 may process commands and data provided from the host 102, and may communicate with the host 102 through at least one of various interface protocols, such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE). In accordance with an embodiment, the host interface 132 is a component for exchanging data with the host 102, which may be implemented through firmware called a host interface layer (HIL).

The ECC unit 138 may correct error bits of the data to be processed in (e.g., outputted from) the memory device 150. To that end, the ECC unit 138 may include an ECC encoder and an ECC decoder. Here, the ECC encoder may perform error correction encoding of data to be programmed in the memory device 150 to generate encoded data into which a parity bit is added and store the encoded data in memory device 150. The ECC decoder may detect and correct errors contained in data read from the memory device 150 when the controller 130 reads the data stored in the memory device 150. In other words, after performing error correction decoding on the data read from the memory device 150, the ECC unit 138 may determine whether the error correction decoding has succeeded and output an instruction signal (e.g., a correction success signal or a correction fail signal). The ECC unit 138 may use the parity bit which is generated during the ECC encoding process, for correcting the error bit of the read data. When the number of error bits is greater than or equal to a threshold number of correctable error bits, the ECC unit 138 may not correct error bits but instead may output an error correction fail signal indicating that the error bits are uncorrectable.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), or a Block coded modulation (BCM). The ECC unit 138 may include any and all circuits, modules, systems or devices for performing the error correction operation based on at least one of the above described codes.

The PMU 140 may manage electrical power in the controller 130. For example, the PMU 140 may detect power-on and power-off. In addition, the PMU 140 may include a power detector.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory. The memory interface 142 may provide an interface for handling commands and data between the controller 130 and the memory device 150, for example, operations of NAND flash interface, in particular, operations between the controller 130 and the memory device 150. In accordance with an embodiment, the memory interface 142 may be implemented through firmware called a flash interface layer (FIL) as a component for exchanging data with the memory device 150.

The memory 144 may support operations performed by the memory system 110 and the controller 130. The memory 144 may store temporary or transactional data generated or delivered for operations in the memory system 110 and the controller 130. The controller 130 may control the memory device 150 in response to a request from the host 102. The controller 130 may deliver data read from the memory device 150 into the host 102. The controller 130 may store data entered through the host 102 within the memory device 150. The memory 144 may be used to store data used by the controller 130 and the memory device 150 to perform operations such as read operations or program/write operations. Furthermore, the memory 144 may include the buffer memory 1306 described with reference to FIGS. 1A to 1J and 2.

The memory 144 may be a volatile memory. The memory 144 may be implemented with a static random access memory (SRAM), a dynamic random access memory (DRAM) or both. Although FIG. 3 shows memory 144 disposed within the controller 130, embodiments are not limited to that arrangement. That is, the memory 144 may be within or external to the controller 130. For instance, the memory 144 may be an external volatile memory having a memory interface transferring data and/or signals between the memory 144 and the controller 130.

The memory 144 may store data for performing operations such as data writing and data reading requested by the host 102 and/or data transfer between the memory device 150 and the controller 130 for background operations such as garbage collection and wear levelling. In accordance with an embodiment, for supporting operations in the memory system 110, the memory 144 may include a program memory, a data memory, a write buffer/cache, a read buffer/cache, a data buffer/cache and a map buffer/cache.

The processor 134 may be a microprocessor or a central processing unit (CPU). The memory system 110 may include one or more processors 134. The processor 134 may control the overall operation of the memory system 110. By way of example but not limitation, the processor 134 can control a program operation or a read operation of the memory device 150, in response to a write request or a read request entered from the host 102. In accordance with an embodiment, the processor 134 may use or execute firmware to control the overall operations of the memory system 110.

Herein, the firmware may be a flash translation layer (FTL). The FTL may serve as an interface between the host 102 and the memory device 150. The host 102 may transmit requests for write and read operations to the memory device 150 through the FTL.

In an embodiment, the processor 134, the host interface 132 and the memory interface 142 may be used to perform the operations of the plurality of sub controllers 1340 to 1343 described with reference to FIGS. 1A to 1J and 2. In an embodiment, the processor 134, the host interface 132 and the memory interface 142 may be used to perform the operation of the monitor 1304 described with reference to FIG. 2. In an embodiment, the processor 134, the host interface 132 and the memory interface 142 may be used to perform the operation of the monitor 1304 described with reference to FIG. 2.

The FTL may manage operations of address mapping, garbage collection, wear-leveling and so forth. Particularly, the FTL may load, generate, update, or store map data. Therefore, the controller 130 may map a logical address, which is entered from the host 102, with a physical address of the memory device 150 through the map data. The memory device 150 may function as a general storage device to perform a read or write operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the particular page to the newly programed page) due to a characteristic of a flash memory device. Further, the controller 130 may store map data of the new data into the FTL.

For example, when performing an operation requested from the host 102 in the memory device 150, the controller 130 uses the processor 134. The processor 134 engaged with the memory device 150 may handle instructions or commands corresponding to an inputted command from the host 102. The controller 130 may perform a foreground operation as a command operation, corresponding to a command from the host 102, such as a program operation corresponding to a write command, a read operation corresponding to a read command, an erase/discard operation corresponding to an erase/discard command and a parameter set operation corresponding to a set parameter command or a set feature command with a set command.

The controller 130 may perform a background operation on the memory device 150 through the processor 134. By way of example but not limitation, the background operation for the memory device 150 includes copying data in a memory block, among the memory blocks 152, 154, 156, and storing such data in another memory block (e.g., a garbage collection (GC) operation). The background operation may include an operation to move data stored in at least one of the memory blocks 152, 154, 156 in the memory device 150 into at least another of the memory blocks 152, 154, 156 (e.g., a wear leveling (WL) operation). During a background operation, the controller 130 may use the processor 134 for storing the map data stored in the controller 130 to at least one of the memory blocks 152, 154, 156, e.g., a map flush operation. A bad block management operation of checking for bad blocks among the plurality of memory blocks 152, 154, 156 is another example of a background operation performed by the processor 134.

In the memory system 110, the controller 130 performs a plurality of command operations corresponding to a plurality of commands received from the host 102. For example, when performing a plurality of program operations corresponding to plural program commands, a plurality of read operations corresponding to plural read commands and a plurality of erase operations corresponding to plural erase commands sequentially, randomly or alternatively, the controller 130 may determine which channel(s) or way(s) for connecting the controller 130 to which memory die(s) in the memory 150 is/are proper or appropriate for performing each operation. The controller 130 may transmit data or instructions via the channel(s) or way(s) for performing each operation. The plurality of memory dies may transmit an operation result via the same channel(s) or way(s), respectively, after each operation is complete. Then, the controller 130 may transmit a response or an acknowledge signal to the host 102. In an embodiment, the controller 130 may check a status of each channel or each way. In response to a command received from the host 102, the controller 130 may select at least one channel or way based on the status of each channel or each way so that instructions and/or operation results with data may be delivered via selected channel(s) or way(s).

The controller 130 may check the states of a plurality of channels (or ways) coupled to a plurality of memory dies that are included in the memory device 150.

By way of example but not limitation, the controller 130 may recognize statuses regarding channels (or ways) associated with memory dies in the memory device 150. The controller 130 may determine each channel or each way as being in a busy state, a ready state, an active state, an idle state, a normal state, or an abnormal state. The controller's determination of which channel or way an instruction (and/or a data) is delivered through can be based on a physical block address, e.g., to which die(s) the instruction (and/or the data) is delivered. The controller 130 may refer to descriptors delivered from the memory device 150. The descriptors may include a block or page of parameters that describe characteristics of the memory device 150, and may have a set format or structure. The descriptors may include device descriptors, configuration descriptors, unit descriptors, and the like. The controller 130 can refer to, or use, the descriptors to determine with which channel(s) or way(s) an instruction or a data is exchanged.

A management unit (not shown) may be included in the processor 134. The management unit may perform bad block management of the memory device 150. The management unit may find bad memory blocks, which are in unsatisfactory condition for further use, as well as perform bad block management on the bad memory blocks. When the memory device 150 is a flash memory such as a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may substantially reduce the utilization efficiency of the memory device 150 having a 3D stack structure and the reliability of the memory system 110. Thus, reliable bad block management may enhance or improve performance of the memory system 110.

Figure 4A:
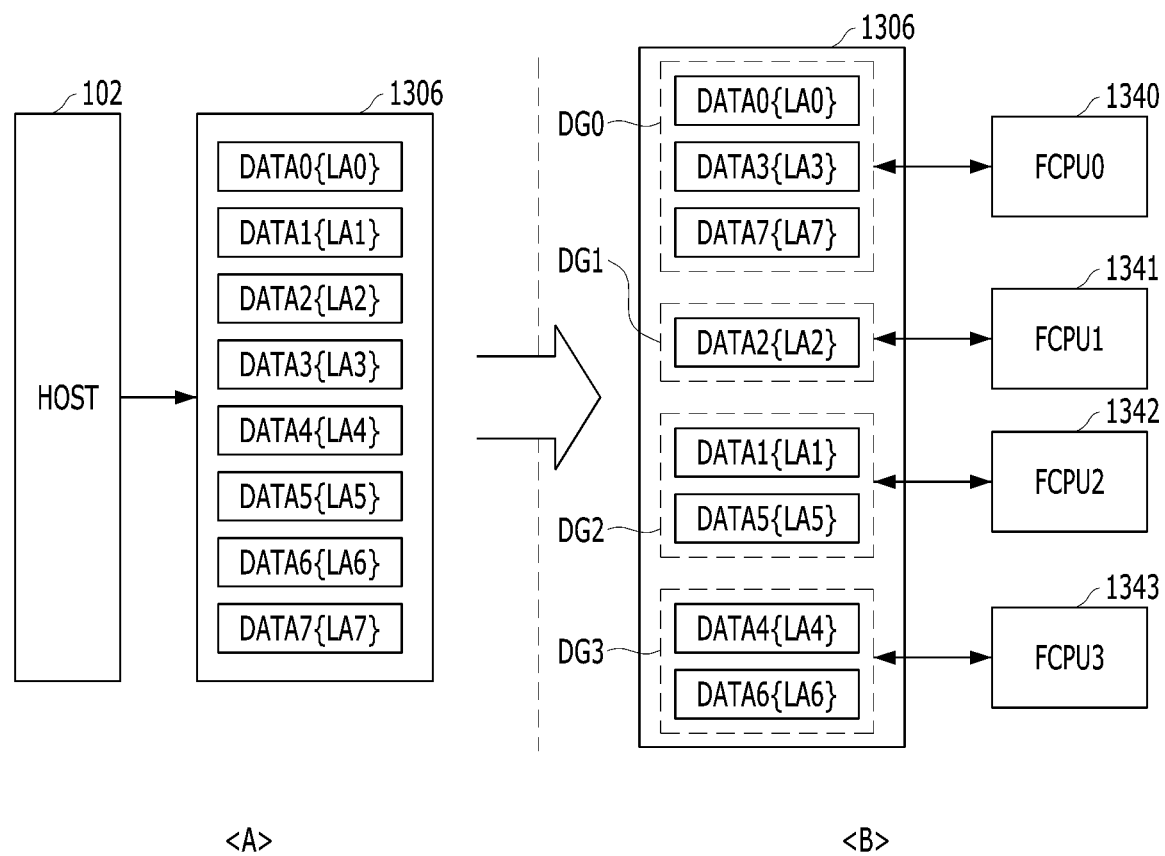
FIGS. 4A and 4B are diagrams for describing a buffer operation of a controller on write data corresponding to the respective memory devices.
Figure 4B:
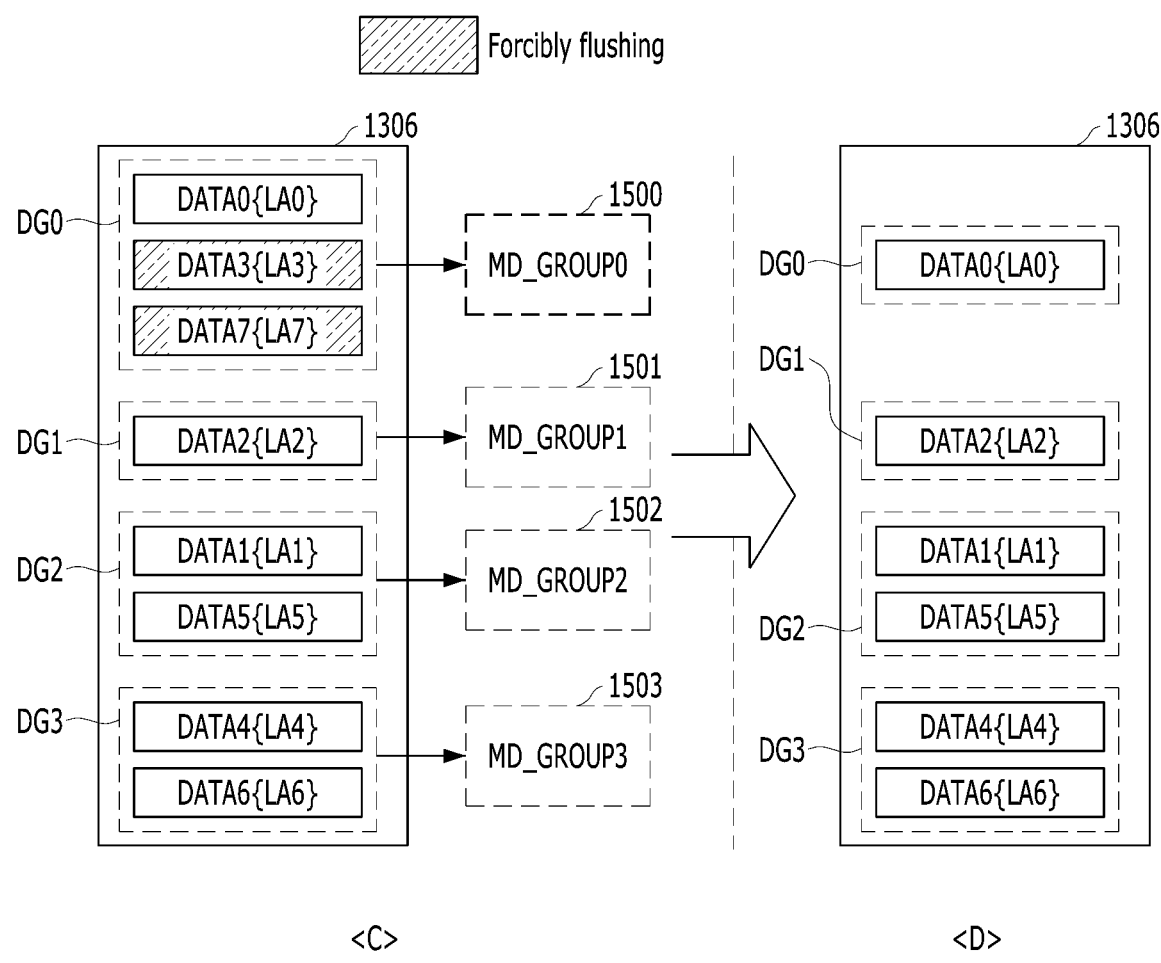

FIGS. 4A and 4B are diagrams for describing the buffer operation of the controller on write data corresponding to the respective memory devices.

Referring to <A> of FIG. 4A, the plural pieces of write data DATA0 to DATA7 inputted from the host 102 may be buffered into the buffer memory 1306 according to the order in which the data are inputted.

Referring to <B> of FIG. 4A, the plural pieces of write data DATA0 to DATA7 buffered in the buffer memory 1306 may be grouped into a plurality of data groups DG0 to DG3 according to the logical addresses LA0 to LA7 corresponding to the write data DATA0 to DATA7. The plurality of data groups DG0 to DG3 may correspond to the plurality of sub controllers 1340 to 1343, respectively. For example, the values of the zeroth logical address LA0, the third logical address LA3 and the seventh logical address LA7, which correspond to the zeroth data DATA0, the third data DATA3 and the seventh data DATA7, respectively, may be included in a logical address value range corresponding to the first sub controller 1340. Therefore, the zeroth data DATA0, the third data DATA3 and the seventh data DATA7 may be grouped into the zeroth data group DG0. The value of the second logical address LA2 corresponding to the second data DATA2 may be included in a logical address value range corresponding to the second sub controller 1341. Therefore, the second data DATA2 may be grouped into the first data group DG1. The values of the first logical address LA1 and the fifth logical address LA5, which correspond to the first data DATA1 and the fifth data DATA5, respectively, may be included in a logical address value range corresponding to the third sub controller 1342. Therefore, the first data DATA1 and the fifth data DATA5 may be grouped into the second data group DG2. Furthermore, the values of the fourth logical address LA4 and the sixth logical address LA6, which correspond to the fourth data DATA4 and the sixth data DATA6, respectively, may be included in a logical address value range corresponding to the fourth sub controller 1343. Therefore, the fourth data DATA4 and the sixth data DATA6 may be grouped into the third data group DG3.

Referring to <C> of FIG. 4B, it is possible to check whether there is a data group having a size larger by the set size or more than the data group having the smallest size, while the plural pieces of write data are grouped into the plurality of data groups DG0 to DG3 as described with reference to <B> of FIG. 4A. Among the plurality of data groups DG0 to DG3, the zeroth data group DG0 may include the zeroth data DATA0, the third data DATA3 and the seventh data DATA7, i.e., three pieces of data, the first data group DG1 may include only the second data DATA2, i.e., only one piece of data, the second data group DG2 may include the first data DATA1 and the fifth data DATA5, i.e., two pieces of data, and the third data group DG3 may include the fourth data DATA4 and the sixth data DATA6, i.e., two pieces of data. Thus, the result the check in this instance indicates that the first data group DG1 has the smallest size. Furthermore, when it is assumed that the set size corresponds to two pieces of data, the zeroth data group DG0 including two more pieces of data in comparison to the first data group DG1 having the smallest size may be selected as the data group having a size larger by the set size or more than the first data group DG1. Since the second and third data groups DG2 and DG3 include one more piece of data in comparison to the first data group DG1, the second and third data groups DG2 and DG3 may not be selected as neither has a size larger by the set size or more than the first data group DG1.

Since the zeroth data group DG0 was selected as the data group having a size larger by the set size or more than the smallest size data group, i.e., the first data group DG1, at least some of the data included in the zeroth data group DG0 may be forcibly flushed and programmed to the zeroth memory device group 1500. For example, the third data DATA3 and the seventh data DATA7 among the zeroth data DATA0, the third data DATA3 and the seventh data DATA7, which are included in the zeroth data group DG0, may be forcibly flushed and programmed to the zeroth memory device group 1500.

Referring to <D> of FIG. 4B, it is possible to recognize that size differences between the plurality of data groups DG0 to DG3 buffered in the buffer memory 1306 are less than the set size, which was achieved by forcibly flushing some data, i.e., DATA3 and DATA7, included in the zeroth data group DG0 in <C> of FIG. 4B. Specifically, as the third data DATA3 and the seventh data DATA7 among the data in the zeroth data group DG0 are programmed to the zeroth memory device group 1500 in <C>, the zeroth data group DG0 may include only the zeroth data DATA0, i.e., only one piece of data, the first data group DG1 may include only the second data DATA2, i.e., only one piece of data, the second data group DG2 may include the first and fifth data DATA1 and DATA5, i.e., two pieces of data, and the third data group DG3 may include the fourth and sixth data DATA4 and DATA6, i.e., two pieces of data, in <D> of FIG. 4B. When it is assumed that the set size corresponds to two pieces of data, there is no data group which includes two or more pieces data than either the zeroth or first data group DG0 or DG1, each of which has the smallest size.

In accordance with embodiments of the present invention, the memory system can manage the buffering operations of write data such that the size differences between the write data, which are independently buffered in response to the respective memory devices in the memory system, are maintained within a set size range.

Although various embodiments have been illustrated and described, it will be apparent to those skilled in the art that various changes and modifications may be made without departing from the spirit and scope of the invention as defined in the following claims.

What is claimed is:
1. A memory system comprising:
a plurality of memory devices;
a buffer memory configured to buffer write data inputted from a host; and
a controller configured to:
classify the write data buffered in the buffer memory into N data groups according to logical addresses corresponding to the write data, N being a natural number greater than or equal to 2,
select at least one data group having a size larger than a data group having a smallest size among the N data groups in the buffer memory when a size difference between two of the N data groups in the buffer memory is greater than a preset size, and
flush at least one piece of data of the selected data group to at least one of the plurality of memory devices.
2. The memory system of claim 1,
wherein the controller flushes at least one piece of data of the selected data group to at least one of the plurality of memory devices so that the N data groups in the buffer memory are maintained within an amount corresponding to the preset size difference.
3. The memory system of claim 2,
wherein the plurality of memory devices are grouped into N memory device groups,
wherein the controller comprises:
N sub controllers respectively corresponding to the N memory device groups, each of the N sub controllers being configured to independently control operations of the corresponding memory device group;

an allocator configured to:
identify the logical addresses of the write data buffered in the buffer memory,
group the write data into the N data groups according to the logical addresses, and
allocate the N data groups to the respective N sub controllers; and
a monitor configured to monitor size differences in the buffer memory between the respective N data groups.

4. The memory system of claim 3, wherein the monitor is further configured to:
check the sizes by the N data groups in the buffer memory,
select at least one data group having the size larger than the preset size than a data group having the smallest size, according to the check result, and
transmit an acknowledgement signal to the sub controller to which the selected data group is allocated, among the N sub controllers.

5. The memory system of claim 4, wherein each of the N sub controllers is further configured to flush, when the acknowledgement signal is received, at least some pieces of data in the data group allocated thereto, among the N data groups, to the corresponding memory device group of the N memory device groups.

6. The memory system of claim 4, wherein each of the N sub controllers is further configured to:
pad, when the acknowledgement signal is received and the size of the data group in the buffer memory allocated to the sub controllers is smaller than a threshold amount, dummy data to at least some data of the data in the data group allocated thereto, among the N data groups, and
flush the dummy-padded data of the threshold amount to the corresponding memory device group among the N memory device groups.

7. The memory system of claim 4, wherein the monitor checks the size of the N data groups through relative size percentages of the N data groups in the buffer memory.

8. The memory system of claim 3, wherein the allocator groups the write data into the N data groups, each of which contains write data in a corresponding logical address range of N logical address ranges.

9. The memory system of claim 8, wherein the allocator transfers physical position information of data in the N data groups from the buffer memory to the N sub controllers, respectively.

10. The memory system of claim 2, wherein the controller is further configured to select at least some pieces of data in the selected data group such that a size difference between the selected data group and the data group having the smallest size is less than the preset size.

11. An operation method of a memory system which includes a plurality of memory devices and a buffer memory for buffering write data inputted from a host, the operation method comprising:
classifying the write data buffered in the buffer memory into N data groups according to logical addresses corresponding to the write data, N being a natural number greater than or equal to 2;
selecting at least one data group having a size larger than a data group having a smallest size among the N data groups in the buffer memory when a size difference between two of the N data groups in the buffer memory is greater than a preset size, and
flushing at least one piece of data of the selected data group to at least one of the plurality of memory devices.

12. The operation method of claim 11,
wherein the flushing includes flushing at least one piece of data of the selected data group to at least one of the plurality of memory devices so that the N data groups in the buffer memory are maintained within an amount corresponding to the preset size difference.

13. The operation method of claim 12, wherein the selecting of the data group comprises:
checking the sizes of the respective N data groups the buffer memory; and
selecting at least one data group having a size corresponding to the preset size than a data group having the smallest size according to the result of the checking.

14. The operation method of claim 13, wherein the sizes of the respective N data groups are checked through relative size percentages of the N data groups in the buffer memory.

15. The operation method of claim 12, wherein the flushing includes:
padding, when a size of the selected data group in the buffer memory is smaller than a threshold amount, dummy data to at least some of the data in the data group allocated thereto, among the N data groups; and
flushing the dummy-padded data of the threshold amount to at least one of the memory devices.

16. The operation method of claim 12, wherein the selecting includes selecting at least some pieces of data such that a size difference between the selected data group and the data group having the smallest size is less than the preset size.

17. The operation method of claim 11, wherein the classifying includes grouping the write data into the N data groups, each of which contains write data in a corresponding logical address range of N logical address ranges.

* * * * *